US012784095B2

(12) United States Patent
Beathard

(10) Patent No.: US 12,784,095 B2
(45) Date of Patent: Nov. 3, 2026

(54) AUTOMATED KIOSK RENTAL SYSTEM AND METHOD OF USE

(71) Applicant: Andrew P. Beathard, Austin, TX (US)

(72) Inventor: Andrew P. Beathard, Austin, TX (US)

(73) Assignee: HoopLocker, Inc., Austin, TX (US)

(*) Notice: Subject to any disclaimer, the term of this patent is extended or adjusted under 35 U.S.C. 154(b) by 69 days.

(21) Appl. No.: 18/897,358

(22) Filed: Sep. 26, 2024

(65) Prior Publication Data

US 2025/0014094 A1 Jan. 9, 2025

Related U.S. Application Data

(60) Provisional application No. 63/585,646, filed on Sep. 27, 2023.

(51) Int. Cl.
*G06Q 30/06* (2023.01)
*G06Q 30/0645* (2023.01)
*G07C 9/00* (2020.01)

(52) U.S. Cl.
CPC ..... *G06Q 30/0645* (2013.01); *G07C 9/00174* (2013.01)

(58) Field of Classification Search
CPC ........................ G06Q 30/0645; G07C 9/00174
See application file for complete search history.

(56) References Cited

U.S. PATENT DOCUMENTS 8,760,296 B2 6/2014 Martin
8,854,184 B2 10/2014 Mullen et al.
9,037,564 B2 5/2015 Lesavich et al.
9,137,250 B2 9/2015 Lesavich et al.
9,361,479 B2 6/2016 Lesavich et al.
9,430,892 B2 8/2016 Amdahl
9,569,771 B2 2/2017 Lesavich et al.
9,706,835 B2 7/2017 Zankier et al.
9,830,583 B2 11/2017 Lowe et al.
9,922,488 B2 3/2018 Joshi et al.
10,671,986 B2 6/2020 Yen et al.
10,810,822 B2 10/2020 Howersten
12,039,821 B2 7/2024 Nitu et al.
2011/0208710 A1 8/2011 Lesavich
2012/0278622 A1 11/2012 Lesavich et al.
(Continued)

FOREIGN PATENT DOCUMENTS

AU 2016204771 B2 10/2018
AU 2021266205 A1 12/2021
CA 2982605 C 1/2018

OTHER PUBLICATIONS

Machine Learning based Facial Recognition and Finger Print Identification for Secure Locker Access , p. 2, Janhavi Baikerikar (Year: 2024).*

*Primary Examiner* — Ilana L Spar
*Assistant Examiner* — Darnell A Pouncil
(74) *Attorney, Agent, or Firm* — Lesavich High-Tech Law Group, S.C.; Stephen Lesavich

(57) ABSTRACT

An automated kiosk rental system and method of use. The rental items are automatically and securely rented and returned to the kiosk without human supervision. The rental items are automatically and securely rented and returned to the kiosk using a kiosk application on a target network device and a kiosk server application on a server kiosk network device both in communications with the kiosk via a communications network.

22 Claims, 16 Drawing Sheets

(56) References Cited

U.S. PATENT DOCUMENTS

| | | | | |
|---|---|---|---|---|
| 2013/0079117 | A1* | 3/2013 | Maskatia | G06Q 20/405 463/25 |
| 2014/0189792 | A1 | 7/2014 | Lesavich et al. | |
| 2015/0356801 | A1* | 12/2015 | Nitu | G07C 9/00904 340/5.61 |
| 2015/0379301 | A1 | 12/2015 | Lesavich et al. | |
| 2016/0321654 | A1 | 11/2016 | Lesavich et al. | |
| 2022/0374973 | A1* | 11/2022 | Fort | G07F 17/12 |
| 2023/0127772 | A1 | 4/2023 | Gottstein et al. | |

* cited by examiner

PROTOCOL STACK

AUTOMATED KIOSK RENTAL SYSTEM AND METHOD OF USE

CROSS REFERENCES TO RELATED APPLICATIONS

This U.S. Utility Patent Application claims priority to U.S. Provisional Patent Application No. 63/585,646, filed on Sep. 27, 2023, the contents of which are incorporated by reference.

FIELD OF INVENTION

This invention relates to kiosks. More specifically it relates to an automated network connected kiosk rental system apparatus with mobile application integration.

BACKGROUND OF THE INVENTION

An electronic kiosk, computer kiosk or interactive kiosk, is an electronic device that houses a computer terminal and employs custom kiosk software designed to users to access system functions. Computerized kiosks may store data locally, or retrieve it from a computer network such as the Internet, a public or private Local Area Network, a cellular telephone networks.

Some computer kiosks provide a free, informational public service, while others serve a commercial purpose. Touchscreens, trackballs, computer keyboards, and pushbuttons are all typical input devices for an interactive computer kiosk. Touchscreen kiosks are commercially used as industrial appliances, reducing lines, eliminating paper, improving efficiency and service.

A kiosk small a small, stand-alone electronic device used in high-traffic areas for marketing purposes, selling products and services. Kiosks may be manned by one or two individuals or may be electronic and unmanned.

Digital kiosks including ticketing booths, airport check-in terminals, or ordering kiosks at quick service and casual restaurants etc. Many malls and even some cities use digital signage kiosks to help users navigate, as well as for display advertising. Other types of kiosks include employment kiosks, healthcare kiosks, cryptocurrency kiosks, photo kiosks, etc.

Kiosks can be used to allow users to rent sports equipment, such as balls, bats, paddles, rackets, shoes, boots, skis, poles, kayaks, etc. Kiosks can also be used to rent power tools, hand tools, cleaning equipment (e.g., carpet cleaners, etc.).

There are several problems related to using kiosks to rent sports equipment, power tools, hand tools, camping equipment, cleaning equipment (e.g., carpet cleaners, etc.).

One problem is that existing kiosks do not provide secure rental and secure return of rental items automatically without human supervision.

Another problem is that existing kiosks do not provide verification that the item rented is the item returned.

Another problem is that existing kiosks do not provide verification that the item rented was not returned in a damaged condition.

Another problem is that existing kiosks do not use digital photographs to record the item rented.

Another problem is that existing kiosks do not use digital photographs to record a user who is renting an item.

Another problem is that existing kiosks are not modular and cannot easily be changed, modified, adapted or configured for different sized rental items.

Therefore, there are problems associated with kiosks used to rent and return items.

Thus, it is desirable to solve some of the problems associated with kiosks to be used to rent and return items.

SUMMARY OF THE INVENTION

In accordance with preferred embodiments of the present invention, some of the problems associated kiosks are overcome. An automated network connected kiosk rental system apparatus with mobile application integration is presented.

The rental items are automatically and securely rented and returned to the kiosk without human supervision. The rental items are automatically and securely rented and returned to the kiosk using a kiosk application on a target network device and a kiosk server application on a server kiosk network device both in communications with the kiosk via a communications network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Exemplary Kiosk Processing and Display System

Figure 1:
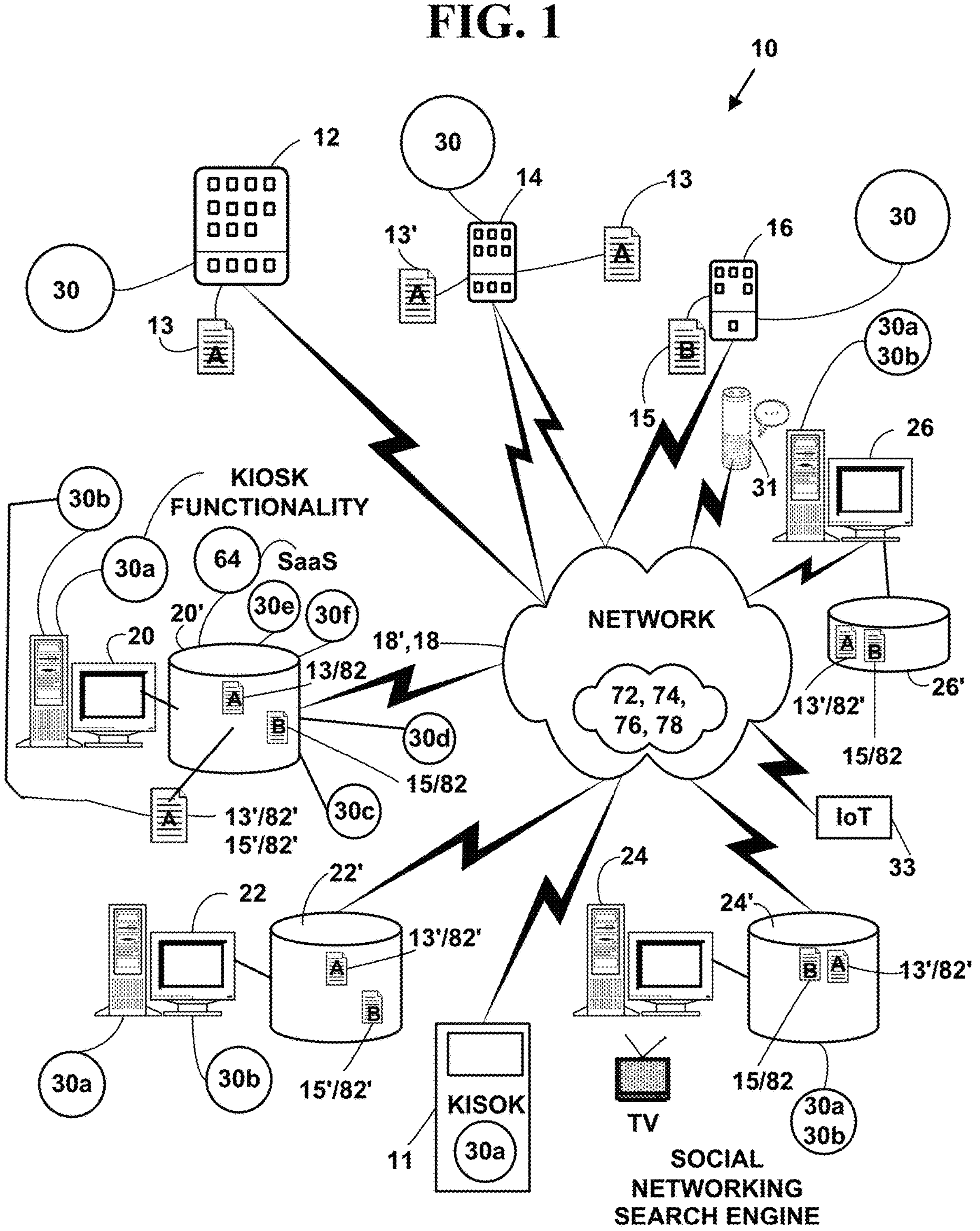
FIG. 1 is a block diagram illustrating an exemplary kiosk processing and display system.

FIG. 1 is a block diagram illustrating an exemplary kiosk processing and display system 10. The exemplary system 10 includes, but is not limited to, one or more kiosks 11, each with one or more processors and each with a non-transitory computer readable medium, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, tablet computers, mobile phones, nonmobile phones with displays, Internet phones, Internet appliances, personal digital/data assistants (PDA), portable, handheld and desktop video game devices, Internet of Things (IoT) devices, cable television (CATV), satellite television (SATV) and Internet television set-top boxes, digital televisions including high definition television (HDTV), three-dimensional (3DTV) televisions, wearable network devices 106-112 (FIG. 6), smart speakers 31 and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, BLUETOOTH and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices 33, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The target network devices 12, 14, 16 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16 make requests 13, 15 for electronic messages (e.g., SMS, MMS, RCS, DM, IM, etc.) via the cloud communications network 18 or non-cloud communications network 18'.

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20',22',24',26'. The plural network devices 20, 22, 24, 26 are in communications with the one or more target devices 12, 14, 16, 31, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13',15' of the electronic content 13, 15 (e.g., SMS, MMS, RCS, DM, IM, messages, etc.) as cloud storage objects 82 (FIG. 5) as is described herein.

The plural server network devices 20, 22, 24, 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Kiosk Processing and Display System

Figure 2:
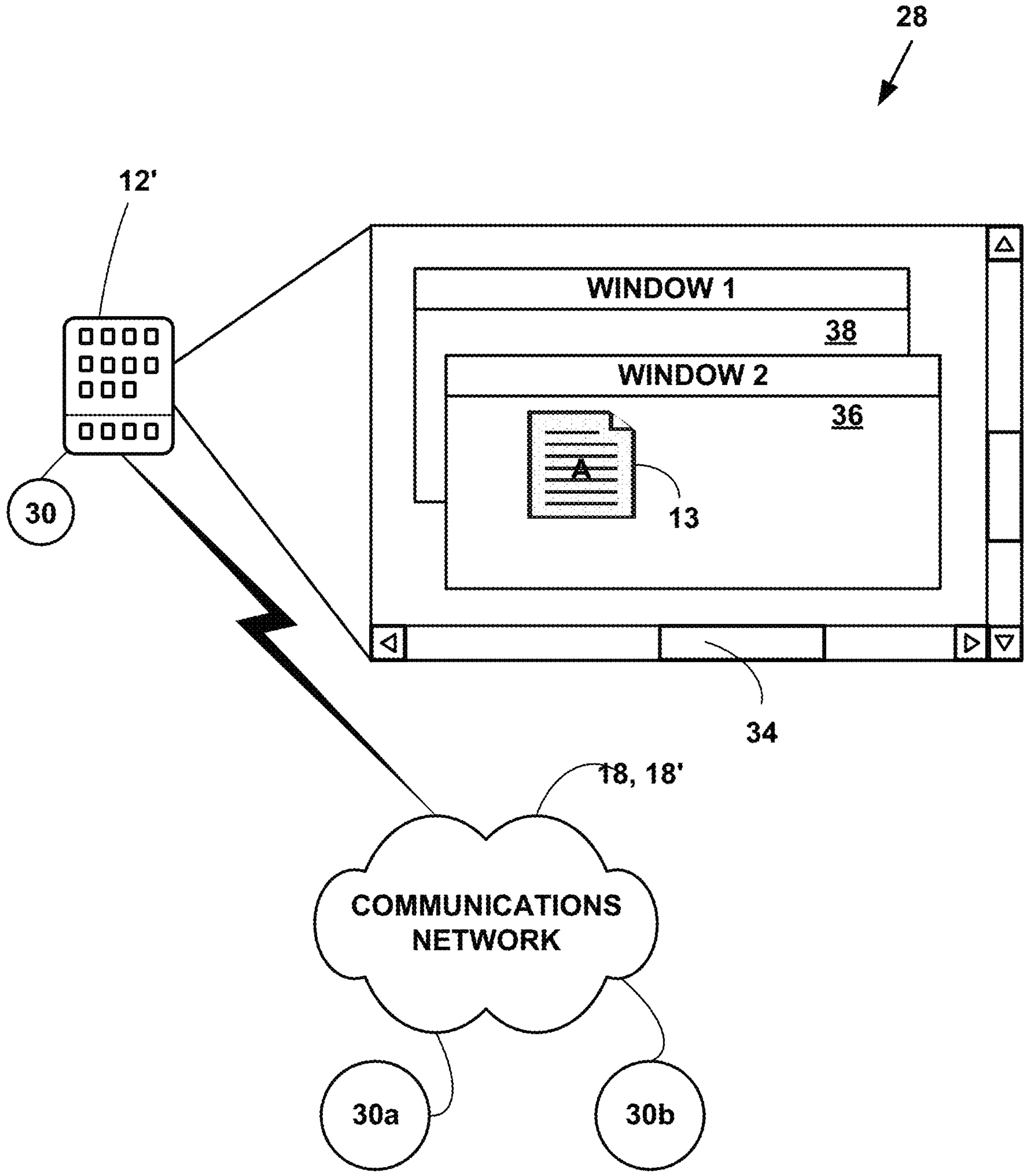
FIG. 2 is a block diagram illustrating an exemplary electronic kiosk display system.

FIG. 2 is a block diagram illustrating an exemplary kiosk 11 processing and display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30*a*, 30*b*, 30*c*, 30*d*, 30*e*, 30*f* includes a cloud application used on a cloud communications network 18. However, the present invention is not limited these embodiments and other embodiments can be used to practice the invention In another embodiment, a portion of the application 30 is executing on the target network devices 12, 14, 16, 31, 98-104 and another portion of the application 30*a*, 30*b*, 30*c*, 30*d*, 30*e*, 30*f* is executing on the server network devices 20, 22, 24, 26. The applications also include one or more library applications. However, the present invention is not limited these embodiments and other embodiments can be used to practice the invention.

Exemplary Networking Protocol Stack

Figure 3:
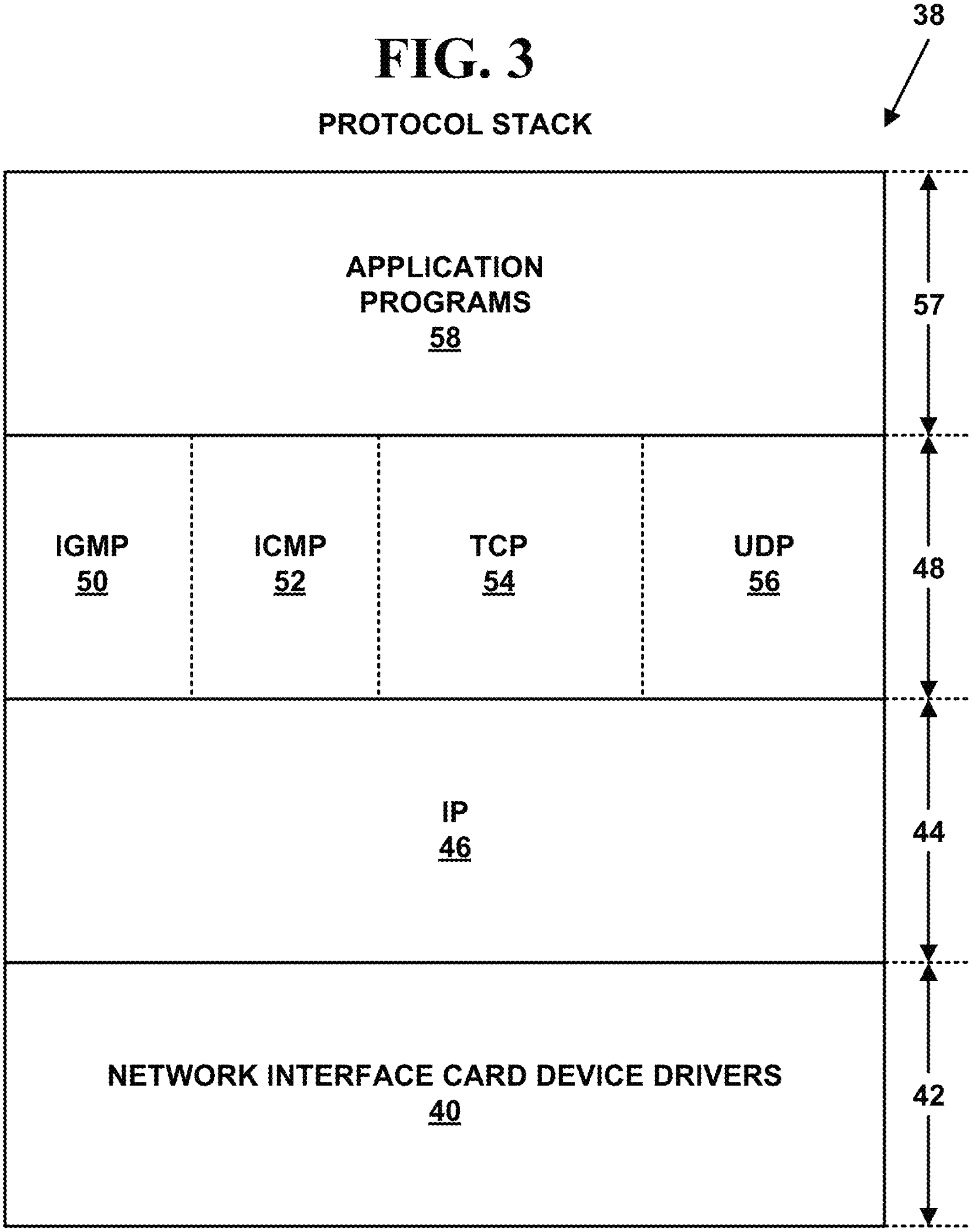
FIG. 3 is a block diagram illustrating an exemplary networking protocol stack.

FIG. 3 a block diagram illustrating a layered protocol stack 38 for network devices in the kiosk processing and display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The kiosk 11, 108 and network devices 12, 14, 16, 20, 22, 24, 26, 31, 98-104 are connected to the communication network 18 with Network Interface Card (NIC) cards 113 including device drivers 40 in a link layer 42 for the actual hardware connecting the network devices 12, 14, 16, 20, 22, 24, 26, 31, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more, fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction-oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, etc.) to carry out desired functionality for a network device reside. For example, the application programs 58 for the client network devices 12, 14, 16, 27, 29, 31, 98-104 may include web-browsers or other application programs, application program 30, while application programs for the server network devices 20, 22, 24, 26 may include other application programs (e.g., 30*a*, 30*b*, 30*c*, 30*d*, etc.).

In one embodiment, kiosk application includes a Kiosk application 30*a*, a security application 30*b*, an Artificial Intelligence (AI) application 30*c* and/or other application 30*d*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.), Short Message Peer-to-Peer (SMPP), and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

The Short Message Peer-to-Peer (SMPP) protocol in the telecommunications industry is an open, industry standard protocol designed to provide a flexible data communication interface for the transfer of short message data between External Short Messaging Entities, Routing Entities (ESME) and Short Message Service Center (SMSC).

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, BLUETOOTH Forum, or the ADSL Forum.

Wireless Interfaces

In one embodiment of the present invention, the wireless interfaces on network devices 12, 14, 16, 20, 22, 24, 26, 31, 98-104 include but are not limited to, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate BLUETOOTH and/or infra data association (IrDA) module for wireless BLUETOOTH and/or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the kiosk 11, 108 and the plural server network devices 20, 22, 24, 26 include a connection to plural network interface cards (NICs) in a backplane connected to a communications bus. The NIC cards provide gigabit/second ($1\times10^9$ bits/second) communications speed of electronic information. This allows "scaling out" for fast electronic content retrieval. The NICs are connected to the kiosk 11, 108 plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.).

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 31, 98-104, server network devices 20, 22, 24, 26, etc.)

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 31, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30*a*, 30*b*, 30*c*, 30*d*, 30*e*, 30*f* provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30*a*, 30*b*, 30*c*, 30*d*, 30*e*, 30*f* provide cloud SaaS 64 services and/or non-cloud application services from Internet television services over the cloud communications network 18 or non-cloud communications network 18'. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30*a*, 30*b*, 30*c*, 30*d*, 30*e*, 30*f* provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30*a*, 30*b*, 30*c*, 30*d*, 30*e*, 30*f* provide cloud SaaS 64 services and/or non-cloud application services from general search engine services. In another embodiment, the cloud applications 30, 30*a*, 30*b*, 30*c*, 30*d*, 30*e*, 30*f* provide general search engine services by interacting with one or more other public search engines (e.g., GOOGLE, BING, YAHOO, etc.) and/or private search engine services.

In another embodiment, the cloud applications 30, 30*a*, 30*b*, 30*c*, 30*d*, 30*e*, 30*f* provide cloud SaaS 64 services and/or non-cloud application services from specialized search engine services, such as vertical search engine services by interacting with one or more other public vertical search engines and/or private search engine services.

However, the present invention is not limited to such general and/or vertical search engine services and more, fewer and/or other general search engine services can be used to practice the invention.

Social Networking Services

In one embodiment, the cloud applications 30, 30*a*, 30*b*, 30*c*, 30*d*, 30*e*, 30*f* provide cloud SaaS 64 services and/or non-cloud application services from one more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30*a*, 30*b*, 30*c*, 30*d*. Security and/or encryption programs may also exist in hardware components on the network devices (12, 14, 16, 20, 22, 24, 26, 31, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
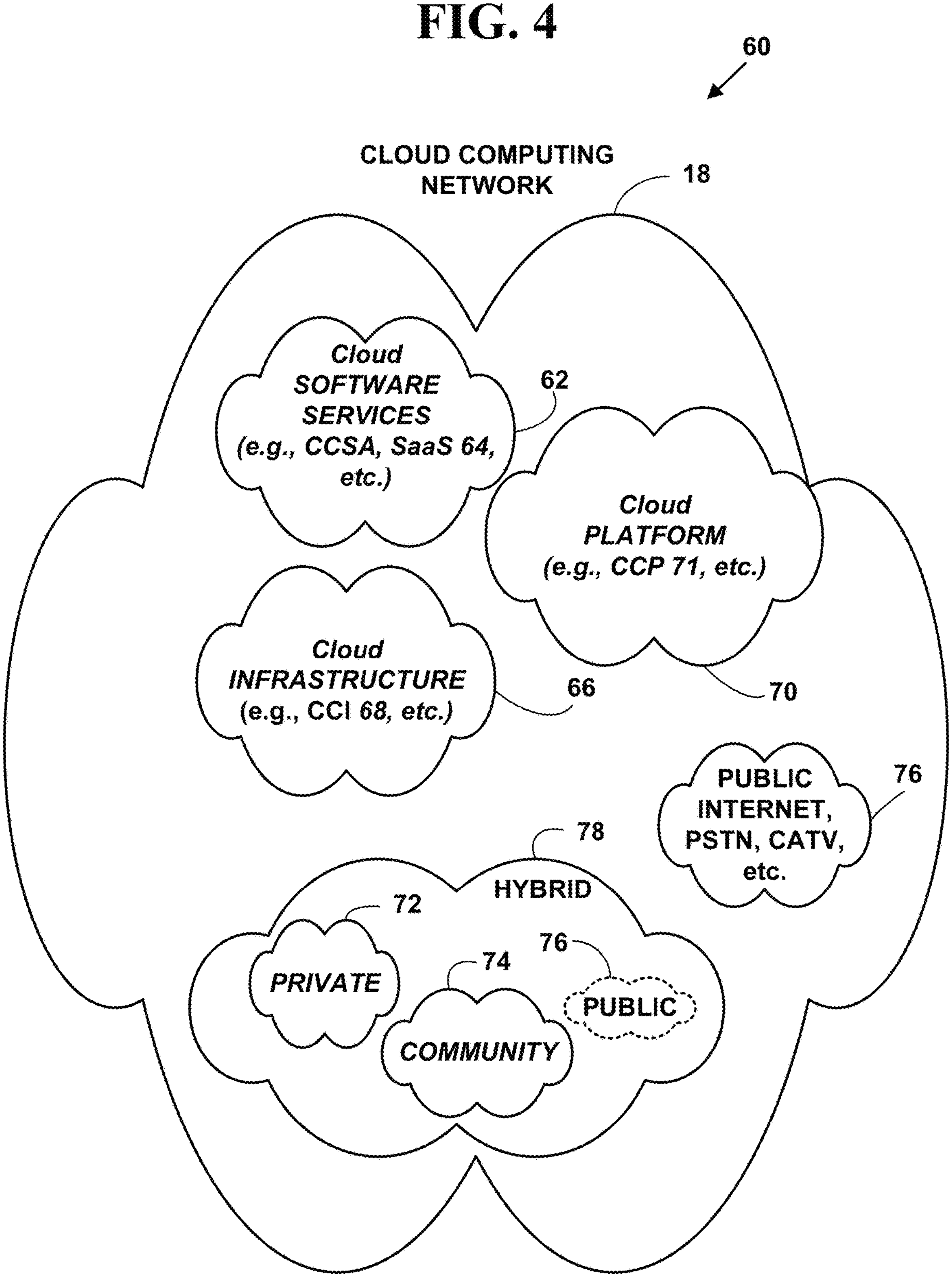
FIG. 4 is a block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

| |
|---|
| 1. On-demand Kiosk interoperability services. Automatic Kiosk interoperability services can unilaterally provision computing capabilities, such as server time and network storage, as needed automatically without requiring human interaction with each network server on the cloud communications network 18. |
| 2. Broadband network access. Automatic Kiosk interoperability services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access. |
| 3. Resource pooling. Automatic Kiosk interoperability services resources are pooled to serve multiple requesters using a multi-tenant model, with different physical and virtual resources dynamically assigned and reassigned according to demand. There is location independence in that a requester of services has no control and/ or knowledge over the exact location of the provided by the Kiosk interoperability service resources but may be able to specify location at a higher level of abstraction (e.g., country, state, or data center). Examples of pooled resources include storage, processing, memory, network bandwidth, virtual server network device and virtual target network devices. |
| 4. Rapid elasticity. Capabilities can be rapidly and elastically provisioned, in some cases automatically, to quickly scale out and rapidly released to quickly scale for Kiosk interoperability service collaboration. For automatic Kiosk interoperability services, multi-media collaboration converters, the automatic Kiosk interoperability services collaboration and analytic conversion capabilities available for provisioning appear to be unlimited and can be used in any quantity at any time. |
| 5. Measured Services. Cloud computing systems automatically control and optimize resource use by leveraging a metering capability at some level of abstraction appropriate to the type of automatic Kiosk interoperability services (e.g., storage, processing, bandwidth, custom electronic content retrieval applications, etc.). Electronic Automatic Kiosk interoperability services collaboration conversion usage is monitored, controlled, and reported providing transparency for both the automatic Kiosk interoperability services provider and the automatic Kiosk interoperability service requester of the utilized electronic content storage retrieval service. |

Exemplary cloud computing service models illustrated in FIG. 4 appear in Table 2. However, the present invention is not limited to these service models and more, fewer or other service models can also be used to practice the invention.

TABLE 2

| |
|---|
| 1. Cloud Computing Software Applications 62 for Kiosk interoperability services (CCSA, SaaS 64). The capability to use the provider's applications 30, 30a, 30b, 30c, 30d, 30e, 30f running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d, 30e, 30f capabilities, with the possible exception of limited user-specific application configuration settings. |
| 2. Cloud Computing Infrastructure 66 for Kiosk interoperability services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d. The user does not manage or control the underlying cloud infrastructure 66 but has control over operating systems, storage, deployed applications, and possibly limited control of select networking components (e.g., host firewalls, etc.). |
| 3. Cloud Computing Platform 70 for Kiosk interoperability services (CCP 71). The capability provided to the user to deploy onto the cloud infrastructure 66 created or acquired applications created using programming languages and tools supported servers 20, 22, 24, 26, etc. The user not manage or control the underlying cloud infrastructure 66 including network, servers, operating systems, or storage, but has control over the deployed applications 30a, 30b, 30c, 30d, 30e, 30f and possibly application hosting environment configurations. |

Exemplary cloud computing deployment models appear in Table 3. However, the present invention is not limited to these deployment models and more, fewer or other deployment models can also be used to practice the invention.

TABLE 3

| |
|---|
| 1. Private cloud network 72. The cloud network infrastructure is operated solely for Kiosk interoperability services. It may be managed by the electronic content retrieval or a third party and may exist on premise or off premise. |
| 2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise. |
| 3. Public cloud network 76. The cloud network infrastructure such as the Internet, PSTN, SATV, CATV, Internet TV, etc. is made available to the general public or a large industry group and is owned by one or more organizations selling cloud services. |
| 4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.) |

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30*a*, 30*b*, 30*c*, 30*d*, offers cloud services for Kisok interoperability. The application 30, 30*a*, 30*b*, 30*c*, 30*d*, 30*e*, 30*f* offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for Kiosk interoperability services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
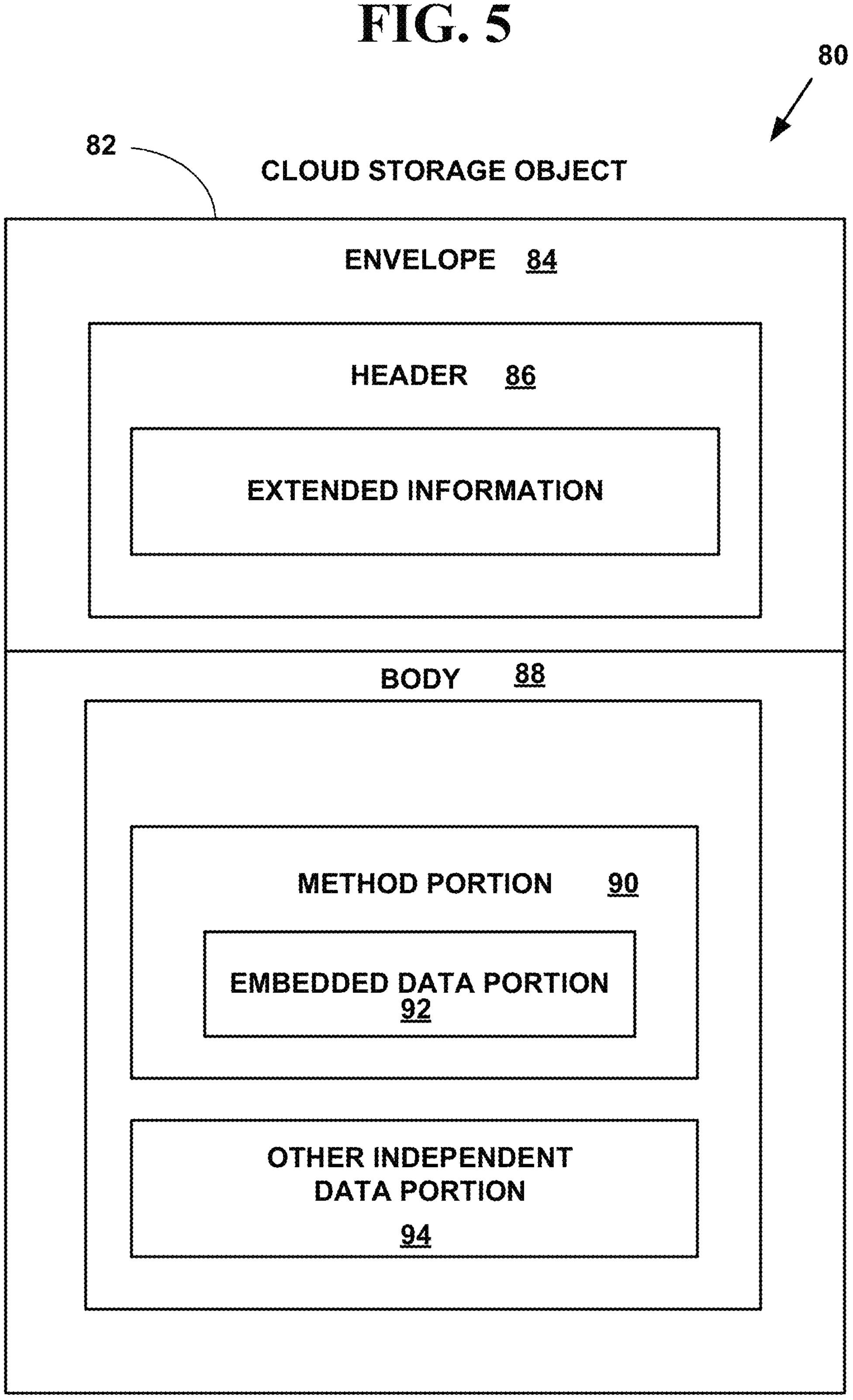
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13',15' of the electronic message content 13, 15 (e.g., SMS, MMS, RCS, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30*a*, 30*b*, 30*c*, 30*d*.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects include Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic Kiosk interoperability services in a cloud or non-cloud environment. In one embodiment, the API for Kiosk interoperability services is available to network devices 12, 14, 16, 20, 22, 24, 26, 31, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
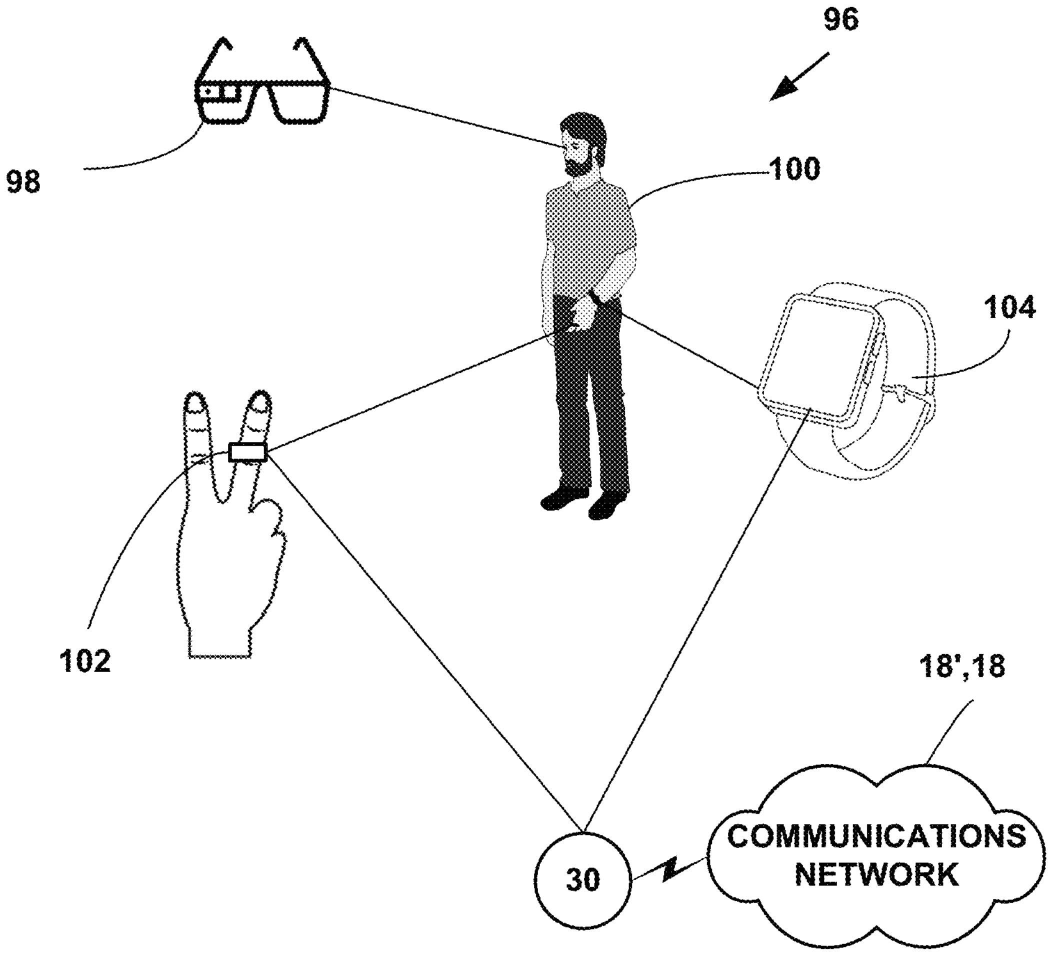
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30*a*, 30*b*, 30*c*, 30*d*, 30*e*, 30*f* interacts with wearable devices 98-104 automatic Kiosk interoperability services the methods described herein. However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30*c* for (1) Kiosk interoperability services. In one embodiment, the AI application 30*c* includes AI for using a kiosk, identifying a user 126 of the kiosk 11, 108, spotting rental trends of rental items, 112"-122", and/or for dispensing and returning rental items 112"-122" (e.g., sports equipment, etc.). However, the present invention is not limited to such an embodiment and more, fewer and/or other AI methods can be used to practice the invention.

In one embodiment, SaaS 64 includes and AI application 30*c* with the AI methods described herein. In another embodiment, the AI application 30*c* is a standalone application. However, the present invention is not limited to such an embodiment, and the AI application 30*c* can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS 64 includes and Big Data application 30*d* with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Direct and Instant Messages

A "direct message" (DM) is a private form of communication between social media users that is only visible to the sender and recipient(s). INSTAGRAM, TWITTER, FACEBOOK and other platforms, allow for direct messages between their users, with varying restrictions by platform.

An "instant message" (IM) is a type of online chat allowing real-time text transmission over the Internet or another computer network. Messages are typically transmitted between two or more parties, when each user inputs text and triggers a transmission to the recipient, who are all connected on a common network.

Multimedia Messaging Service (MMS)

Multimedia Messaging Service (MMS) is a standard way to send messages that include multimedia content to and from a mobile phone over a cellular network. Users and providers may refer to such a message as a PXT, a photograph message, and/or a multimedia message.

The MMS Internet Engineering Task Force (IETF) Request for Comments (RFC) 4355 and 4356, are incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.)

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13 Oct. 2017, GSM Association, Rich Communication Suite RCS API Detailed Requirements, version 3.0, Oct. 19, 2017, Rich Communication Suite 8.0 Advanced Communications Services and Client Specification Version 9.0, 16 May 2018, RCS Universal Profile Service Definition Document Version 2.2, 16 May 2018, and Rich Communication Suite Endorsement of OMA CPM 2.2 Conversation Functions Version 9.0, 16 Oct. 2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/or selected features of available RCS functionality. The RCS message application and the RCS interoperability application provides full and/or partial RCS functionality including, but not limited to, RCS-e functionality.

The RCS functionality of the present invention also includes selected portions of RCS functionality used in message application and the RCS interoperability application. However, the present invention is not limited to such embodiments.

Rental Kiosks for Rental Items

Figure 7:
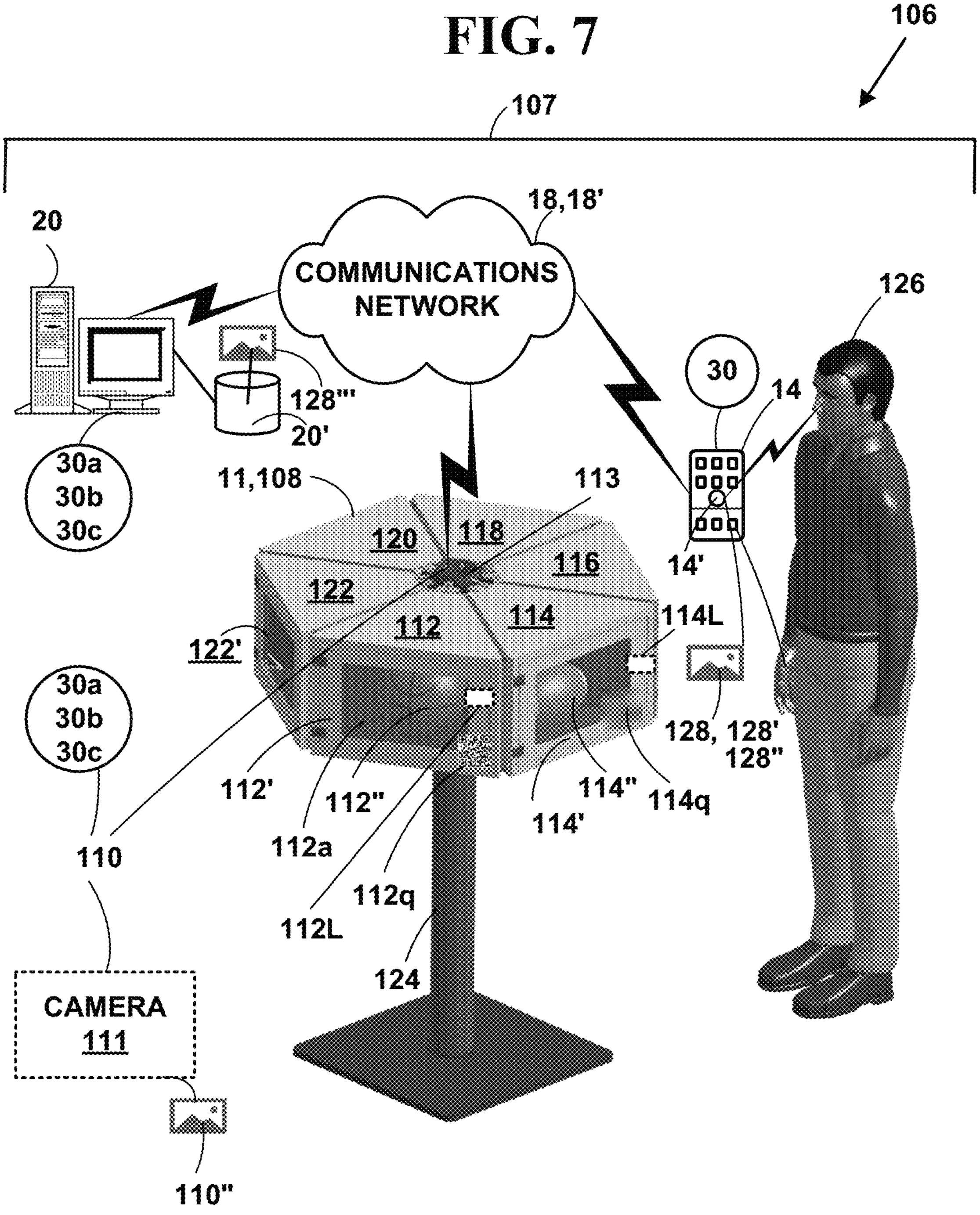
FIG. 7 is a block diagram illustrating a kiosk processing system for rental items.

FIG. 7 is a block diagram 106 illustrating a kiosk processing system for rental items 107.

FIG. 7, illustrates a kiosk 11,108, including a kiosk processing unit with one or more processors, a non-transitory computer readable medium, a power source, and a kiosk application 30*a*, 30*b*, 30*c*, the kiosk application 30*a*, 30*b*, 30*c* controlling operation of the kiosk 11, 108. The kiosk including plural individual compartments 112-122 (six of which are illustrated), the plural individual compartments 112-112 each including an individual compartment door 112'-122' and a locking means 112L-122L (only two of which are illustrated, 112L, 114L for simplicity) the plural individual compartments 112-122 including a plural rental items 112"-122" (only two of which are illustrated as a basketball 112" and a football 114") that are rented out with a rental process for a pre-determined of time and for a pre-determined fee, the plural rental items 112"-122" removeable from the plural individual compartments 112-122 and returnable to the plural individual compartments 112-122 after the pre-determined time of the rental process expires, the locking means 112L-122L, locking and unlocking the plural individual compartment doors 112'-122' of the plural individual compartments, 112-122, the locking means 112L-122L controlled by the kiosk application 30*a*, 30*b*, 30*c*, one or more network interface cards (NIC) 113 for communicating with a wireless or wired communications network 18, 18', one or more camera components 111 to document, provide security and/or identify users 126 for the rental process on the kiosk 11, 108; and a plural bar codes 112*q*-122*q* on the plural individual compartment doors 112'-122' for scanning by a target kiosk application 30 on one or more target network devices 12, 14, 16, 31, 33, 98-104 with one or more processors to initiate and complete the rental process on the kiosk 11, 108. However, the present invention is not limited to such an embodiment, and more, fewer and other components can be used to practice the invention.

In one embodiment, the power source includes a Direct Current (DC) power source including but limited to, one or more batteries, one or more solar panels, etc. and/or an Alternating Current (AC) power source. However, the present invention is not limited to such an embodiment and other power sources can be used to practice the invention.

In one embodiment, the rental items 112"-122", include but are not limited to, sports equipment includes balls, ball gloves, bats, rackets, skates, shoes, skis, boots, poles, kayaks, paddle boards, paddles, and/or bicycles, or a combination thereof. However, the invention is not limited to such an embodiment and other embodiments with more, fewer and other types of rental items can be used to practice the invention.

In one embodiment, all and/or selected ones of individual compartments 112-122, include an additional free physical product. In such an embodiment, the additional free physical products, include but are not limited to actual goods from advertisers and/or partners (e.g., t-shirts, key chains, mugs, and/or other promotional items, etc.). In one embodiment, the one or more additional free physical products include a bar code (e.g., QR code) and/or a universal resource locator (URL) for a virtual product or a virtual service. The bar code is scanned and the URL is scanned and/or typed into a target network device 12, 14, 16, 31, 33, 98-104. The additional free physical products also include, but are not limited to, paper coupons, gift cards, paper items including bar codes (e.g., QR codes, etc.) and URLs that provide links to free virtual products (e.g., virtual coupons, discount codes, etc.) and/or virtual services (e.g., free and discounted sessions for professional services (e.g., medical, dental, accounting, legal, automotive, etc.)0. However, the present is not limited to such an embodiment and more, fewer and/or other types of free physical and/or virtual products and/or virtual services can be used to practice the invention.

In one embodiment, the locking means 112L-122L, include, but are not limited to an electric lock and/or a smart lock and/or a combination thereof. However, the invention is not limited to such an embodiment and other embodiments with more, fewer and other types of rental items can be used to practice the invention.

In one embodiment, an electronic lock includes a locking device which operates by means of electric current (e.g., AC. DC, etc.) and are not connected to a communications network 18, 18', and do not provide remote access or monitoring capabilities.

In one embodiment a smart lock includes an electronic locking device connected to a communications network 18, 18' and allows remote control via kiosk application 30*a*, 30*b*, 30*c* on the kiosk 11, 108, kiosk applications 30 on target network devices 12, 14, 16, 31, 33, 98-104 and server kiosk applications 30*a*, 30*b*, 30*c* on server network devices, 20, 22, 24, 26.

In one embodiment, the kiosk 11, 108 further includes, but is not limited to, one or more display screens, one or more speakers, one or more lighting components, one or more solar panels, and/or one or more biometric interfaces.

In one embodiment, the more display screens include, but are not limited to, Liquid Crystal Display (LCD), Light Emitting Diode (LED) display, Thin-Film Transistor (TFT) LCD, Quantum dot (QLED) display, Active-Matrix Organic LED, (AMOLED), and/or other types of display screens, with the one or more speakers and/or one or more smart speakers 31 to display audio, video and electronic textual information on the kiosk 11, 108. However, the present invention is not limited to such embodiments and other embodiments with more, fewer and other types of display screens and/or speakers can be used to practice the invention.

In one embodiment, the one or more lighting components include, but are not limited to, incandescent, compact fluorescent (CFL), halogen, and/or light-emitting diode (LED) lighting components to allow use of kiosk 11, 108 at night, to add visual appeal to the kiosk 11, 108 and for advertising and branding by displaying lights of desired colors by displaying lights of desired colors for the advertising and/or branding to attract users 126 to the kiosk 11, 108. However, the present invention is not limited to such embodiment and other embodiments with more, fewer and other types of lighting components can be used to practice the invention.

In one embodiment, the one or more solar panels include, but are not limited to, monocrystalline, polycrystalline, Passivated Emitter and Rear Cell or Passivated Emitter and Rear Contact (PERC), and/or thin-film solar panels. A solar panel is a component of a photovoltaic system that is made out of a series of photovoltaic cells arranged to generate electricity using sunlight. The one or more solar panels are used as a main and/or alternative power source for the kiosk 11, 108. However, the present invention is not limited to such embodiment and other embodiments with more, fewer and other types of solar panels can be used to practice the invention.

In one embodiment, biometrics include, but are not limited to, measurable physical characteristic and/or personal behavioral traits used to recognize the identity, or verify an identity of a user 126 of the kiosk 11, 108. In one embodiment, the one or one or more biometric interfaces include, but are not limited to, fingerprint, facial recognition, voice recognition, iris recognition and/or palm or finger vein pattern recognition, biometric interfaces. The one or more biometric interfaces are used by the kiosk application 30*a*, 30*b*, 30*c* on the kiosk 11, 108 to confirm an identity of a user 126 of the kiosk 11, 108. However, the present invention is not limited to such embodiment and other embodiments with more, fewer and other types of biometric interfaces can be used to practice the invention.

In one embodiment, transactions for the pre-determined fees for the rental process on the kiosk 11, 108 are recorded in a blockchain.

In one embodiment, a blockchain includes a system in which a record of rental events (e.g., rental of a rental item, return of a rental item, etc.) rental transactions, such as fee payments for rental items rented from the kiosk 11, 108, are maintained across network devices 11, 12, 14, 16, 20, 22, 24, 26, 31, 33, 98-104, 108 that are linked in a peer-to-peer communications network.

In one embodiment, the blockchain is stored on the kiosk 11, 108 and/or one or more server network devices 20, 22, 24, 26. However, the present invention is not limited to such embodiment and other embodiments with more, fewer and other types of blockchains can be used to practice the invention.

In one embodiment, the kiosk 11, 108 further includes desired colors, graphics, plastic wraps, vinyl wraps, other types of wrapping materials, etc. for branding and/or advertising for specific branding and/or advertising partners such as corporations, local businesses, schools, colleges, universities, etc.

In FIG. 7, the locker compartments 112-122 are illustrated as all a same size. However, in other embodiments, the locker compartments 112-122 are of varying sizes to store and rent items of different sizes (e.g., ski boots for first size locker component and skis for a second size locker component, etc. The kiosk 11, 108 further includes a stand 124 to support the kiosk and to allow the kiosk to be secured to a surface (e.g., the ground, a floor, etc.) to prevent movement and theft.

In one embodiment, the kiosk applications 30 on the one or more target network device 12, 14, 16, 31, 33, 98-104 and/or the server kiosk applications 30*a*, 30*b*, 30*c* include a cloud SaaS 64 on a cloud communications network 18. However, the present invention is not limited to such an embodiment and other embodiments can be used to practice the invention.

The kiosk processing unit 110 is in communications with an external server network device (e.g., 20, etc.) and one or more target network devices (e.g., 14), etc.), each with one or more processors, one of each is illustrated for simplicity. The kiosk processing unit 110 and the server network device 20 includes server kiosk applications 30*a*, 30*b*, 30*c*. The target network device 12, 14, 16, 31, 33, 98-104 includes a kiosk application 30 that is used by a user 126 to pay a fee electronically to rent an individual sport item 112"-122" and request an access code to open a selected door (e.g., 112' to rent the basketball 112", etc.) in the kiosk 11, 108. The server kiosk application 30*a* server network device 20, collects the electronic fee from target network device 12, 14, 16, 31, 33, 98-104 and sends an access code back to the kiosk processing unit 110 to open a selected door 112' for the user 126 via the communications network 18, 18'.

In one embodiment, the secure checkout and return process uses AI and/or computer vision algorithms 30 via a camera component 14' on the target network device 12, 14, 16, 31, 33, 98-104 to ensure secure checkout and return of an individual sports item 112". In one embodiment, the target network device 12, 14, 16, 31, 33, 98-104 must have a functioning camera component 14' in order to initiate a secure checkout and return. The checkout process begins when the user 126 requests rental of a sports item 112" via the kiosk application 30 on the target network device 12. The target network device 12 sends a message to the kiosk processing unit 110 which contacts the server kiosk application 30*a* on the kiosk service network device 20 via the communications network 18, 18' to request rental of the desired sports item 112" and collection of a desired electronic fee. The server kiosk application 30*a* on the kiosk server network device 20, 22, 24, 26 collects the desired electronic fee (e.g., credit card, payment service, bank transfer, easy pay service, etc.) from the target network device 12, 14, 16, 31, 33, 98-104 of the user 126. The user 126 is instructed to place the camera component 14' of their target network device 12, 14, 16, 31, 33, 98-104 against the clear window portion 112*a* on the front door 112' of the locker component 112. The locker compartment 112 contents including the desired sports item 112" (e.g., basketball, etc.) are detected, a digital photograph 128 is captured of the sports item 112", to record its type, model, condition, etc. on the target network device 12, 14, 16, 31, 33, 98-104. In one embodiment, the kiosk application 30 on the target network device 12, 14, 16, 31, 33, 98-104 sends a copy of the digital photograph 128 to the server kiosk application 30*a* on the kiosk server network device 20, 22, 24, 26 to store in a database 20' and/or in one or more cloud storage objects 82. In another embodiment, the digital photograph 128 is not sent to the server kiosk application 30*a* on the kiosk server network device 20, 22, 24, 26 and the digital photograph 128 is kept locally in a non-transitory computer readable medium on the target network device. The target network device 12, 14, 16, 31, 33, 98-104 of the user 126 notifies the kiosk processing unit 110 that the digital photograph 128 has been taken. The kiosk processing unit 110 sends a message to the server kiosk application 30*a* on the kiosk server network device 20, 22, 24, 26 that the digital photograph 128 has been taken and the server kiosk application 30*a* on kiosk server network device 20, 22, 24, 26 sends the kiosk processing unit 110 an access code to open the door 112' of desired locker component 112. The locker component 112 door 112' opens, and the rental begins for the desired sports item 112".

In another embodiment, the user 126 is instructed by the kiosk application 30 on the target network device 12, 14, 16, 31, 33, 98-104 to take a photograph 128' of the user 126 in addition to the contents of the locker component 112. The photograph 128' of the user 126 is sent to the kiosk processing unit 110 for temporary storage in a non-transitory computer readable medium. In another embodiment, the photograph 128' of the user is sent from the kiosk application 30 on the target network device 20 to the server kiosk application 30*a* on the kiosk server network device 20, 22, 24, 26 and saved in the database 20'. In such embodiments, an additional security feature is included on the kiosk processing unit 110 and the server kiosk application 30*a* on the kiosk server network device 20, 22, 24, 26 to allow facial recognition of the user 126 to prevent fraud or other criminal activities by the user 126 based on prior and/or current behavior of the user 126. An account check, background check, credit check, etc. can also be completed by the server kiosk application 30*a* before accepting any payment from the user 126. However, the present invention is not limited to such an embodiment and other embodiments can also be used to practice the invention.

In another embodiment, the user 126 is instructed to pose for a camera component 111 on the kiosk processing unit 110 to collect a photograph 110" of the user 126. In such an embodiment, the photograph 110" of the user 126 is sent to the server kiosk application 30 on the kiosk server network device 20, 22, 24, 26 and saved in the database 20' and/or in one or more cloud storage objects 82. In such an embodiment, an additional security feature is included on the server kiosk application 30*a* to allow facial recognition of the user 126 to prevent fraud or other criminal activities by the user 126 based on prior behavior of the user 126. An account check, background check, credit check, etc. can also be completed by the server kiosk application 30*a* before accepting any payment from the user 126. However, the present invention is not limited to such an embodiment and other embodiments can also be used to practice the invention.

When the user 126 has finished using the sports item 112", the user 126 places the item 112" back in the same locker compartment 112 was dispensed from and close the door 112' to initiate the return. The user 126 is again instructed to place the camera component 14' of their target network device 12, 14, 16, 31, 33, 98-104 against the clear window portion 112*a* on the front door 112' of the locker component 112. The locker compartment 112 contents including the sports item 112" (e.g., basketball, etc.) are detected, a second photograph 128" is captured of the sports item 112", to record its type, model, condition, etc. on the target network device 12, 14, 16, 31, 33, 98-104.

In one embodiment, the kiosk application 30 on the target network device 12, 14, 16, 31, 33, 98-104 compares first digital photograph 128 to the second photograph 128". In another embodiment, the target network device 12, 14, 16, 31, 33, 98-104 sends the second photograph 128" to the kiosk server application 30*a* on the kiosk server network device 20, 22, 24, 26 for comparison with the first photograph. In yet another embodiment, the second photograph 128" is sent from the target network device 12, 14, 16, 31, 33, 98-104 to the kiosk processing unit 110 for comparison. However, the present invention is not limited to such an embodiment and other embodiments can also be used to practice the invention.

One the contents of the sports item 112" is detected in the locker compartment 112, the kiosk processing unit 110 locks the door 112' of the locker component 112, to complete the return. At this point the user 126 will have no way to open the locker component again 112 again without paying an additional electronic fee. In one embodiment, the checkout and check-in photographs 128, 128" are further evaluated to ensure that the sport item 112" return was valid (e.g., a basketball of brand-X was rented and a basketball of brand-Y was returned, etc.) and the sports item 112" was not damaged, etc. If the return is not valid or the sports item 112" was damaged the user 126 is automatically charge an additional electronic fee.

In one embodiment, the kiosk 11, 108 is an assembly of lockers 112-122. The kiosk processing unit 110 of kiosk 11, 108 is controlled by a cellular telephone enabled microcontroller (MCU) that sends and receives commands via a Message Queuing Telemetry Transport (MQTT) message protocol from the target kiosk application 30 on the target network device 12, 14, 16, 31, 33, 98-104. However, the present invention is not limited to such an embodiment and the kiosk 11, 108 can be controlled by other microcontrollers and/or other network controllers.

In one embodiment, the cellular telephone enabled microcontroller (MCU) includes a microcontroller for answering cellular telephone calls from the target kiosk application 30 on the target network device 12, 14, 16, 31, 33, 98-104. However, the present invention is not limited to such an embodiment and other processors and/or CPUs can be used to practice the invention.

MQTT is an extremely simple and lightweight messaging protocol (e.g., subscribe and publish) designed for limited devices and networks with high latency, low bandwidth or unreliable networks. MQTT is a type of machine-2-machine (M2M) network protocol for message queue/message queuing service. It is designed for connections with remote locations that have devices with resource constraints or limited network bandwidth, such as in Internet of Things (IoT) devices 33. However, the present invention is not limited to such an embodiment and other protocols such as NFC, M2M, InfraRed, BLUETOOTH, RFID, TCP/IP and/or other messaging protocols can be used to practice the invention.

When a user 126 selects a kiosk 11, 108 in the target kiosk application 30 on the target network device 12, 14, 16, 31, 33, 98-104, an MQTT connection is established between the user's 125 target network device network device 12, 14, 16, 31, 33, 98-104 and the kiosk 11, 108. MQTT is a pubsub-based communication protocol. The topics subscribed to by the target kiosk application 30 on the target network device 12, 14, 16, 31, 33, 98-104 and the kiosk 11, 108 remain constant. That is, the target kiosk application 30 on the target network device 12, 14, 16, 31, 33, 98-104 will always subscribe to the same topic, which is dependent on the client ID (i.e., target network device ID), and each kiosk 11, 108 will always subscribe to the same topic, which is dependent on the kiosk ID. The topics to which the target kiosk application 30 on the target network device 12, 14, 16, 31, 33, 98-104 and the kiosk 11, 108 publish are dynamic. For example, when the user 126 selects a kiosk 11, 108 on target kiosk application 30 on the target network device 12, 14, 16, 31, 33, 98-104, they publish messages to the 'client/pub/${KioskID}' topic, the same topic subscribed to by each individual kiosk 11, 108. Included in each message from the target kiosk application 30 on the target network device 12, 14, 16, 31, 33, 98-104 to the kiosk 11, 108 is the Client ID. When the kiosk 11, 108 receives the message, it will dynamically publish back to target kiosk application 30 on the target network device 12, 14, 16, 31, 33, 98-104 subscription topic, 'kiosk/pub/${ClientID}'. However, the present invention is not limited to such embodiments and other embodiments can be used to practice the invention.

In one embodiment, the individual locker components 112-122 are assembled in modular fashion to form the kiosk 11, 108 such that they can quickly be plugged in to communicate with the MCU. A command sent from the target kiosk application 30 on the target network device will usually be addressed for a single locker component (e.g., 112, etc.) of the kiosk 11,108. The two commands required for a checkout process are the doorOpen and the doorState commands. The doorOpen commands will tell the kiosk 11, 108 to open the door 112' of the desired locker component 112. The doorState command will query the state of the desired locker component 112 and return the value [open/closed]. The number of locker components 112-122 making up the kiosk 11, 108 is not predefined. Rather, it is configurable so that 1, 2, or more locker components 112-122 can all be connected to the same MCU. In another embodiment, each locker component 112-122 is connected to its own MCU. However, the present invention is not limited to such an embodiment and other embodiments can be used to practice the invention.

In one embodiment, the kiosk 11, 108 MCU is a stateless system. It does not manage or keep track of the status of any rental or checkout process, it simply responds to the commands sent to it. The state of a rental process is managed within the kiosk server application **30*a* on the kiosk server network device 20**. However, the present invention is not limited to such an embodiment and other embodiments can be used to practice the invention.

In another embodiment, the kiosk 11, 108 MCU is a state-based system. It does manage and/or keep track of the status of any rental or checkout process, including storing, comparing, photographs 128, 128", etc. However, the present invention is not limited to such an embodiment and other embodiments can be used to practice the invention.

In one embodiment, the kiosk 11,108 operations are powered via solar-charged battery and therefore the system 10 does not depend on any existing power infrastructure. In another embodiment, the kiosk 11, 108 uses electrical power (e.g., AC, DC, etc.) and/or storage power components (e.g., batteries, capacitors, etc.). However, the present invention is not limited to such an embodiment and other embodiments can be used to practice the invention.

In one embodiment, the target kiosk application 30 is the means by which a user 126 can communicate with the kiosk 11, 108. The user 126 can also search for nearby kiosks on a digital map, check the status of a locker component 112-122, initiate a checkout and return, etc. Like the kiosk MCU, the target kiosk application 30 on the target network device 12, 14, 16, 31, 33, 98-104 connects directly to a MQTT broker to establish communication with the kiosk 11, 108. Information related to specific locker components 112-122 such as locker number, item type, and usage status is stored in the database 20' by the server kiosk application **30*a* on the kiosk sever network device 20. The target kiosk application 30 on the target network device 12 can also access information about the status of certain items by making queries to the database 20' via the server kiosk application 30*a* on the kiosk sever network device 20**.

In one embodiment, the target kiosk application 30 on the target network device 12 is also responsible for keeping track of the state of a rental, and for making appropriate mutations and queries to the server kiosk application **30*a* on the kiosk sever network device 20** to keep track of the status of a rental.

For example, when the rental is initiated and the locker door is opened, the target kiosk application 30 on the target network device 12 will create a new rental object data structure in the database 20' via the server kiosk application **30*a* on the kiosk sever network device 20 and record the starting time. At this time the status of the locker component 112-122 in the database 20' is updated via the server kiosk application 30*a* on the kiosk sever network device 20 to prevent more than one user from sending commands to the same locker component 112-122. When the user 126 has successfully returned the sports item 112", the rental object data structure is updated and the locker component 112-122 is made available again for other users to rent. However, the present invention is not limited to such an embodiment and other embodiments can be used to practice the invention In another embodiment, the kiosk processing unit 110 is responsible for keeping track of the state of a rental. In another embodiment, the server kiosk application 30*a* on the kiosk sever network device 20** is responsible for keeping track of the state of the rental. However, the present invention is not limited to such embodiments and other embodiments can be used to practice the invention.

In one embodiment, the target kiosk application 30 on the target network device 12, 14, 16, 31, 33, 98-104 sends electronic messages 13, 15 (e.g., SMS, MMS, RCS, IM, DM, etc.) via the cloud communications network 18 and/or non-cloud communications network 18' to the server kiosk application **30*a* on the kiosk sever network device 20 and/or the kiosk processing unit 110 on the kiosk 11, 108**. However, the present invention is not limited to such embodiments and other embodiments can be used to practice the invention.

Figure 8A:
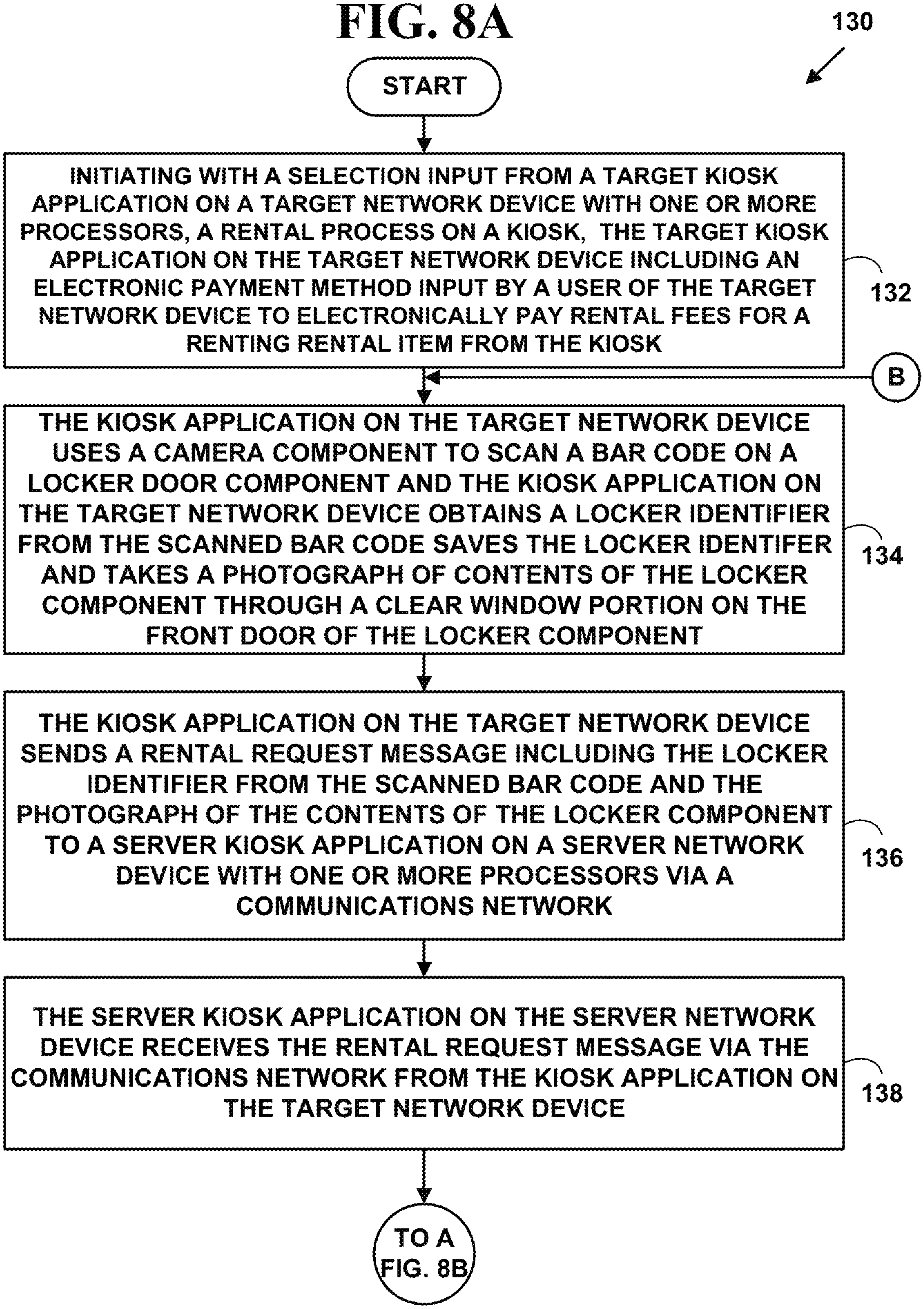
FIGS. 8A, 8B and 8C are a flow diagram illustrating a method for kiosk rental request processing.
Figure 8B:
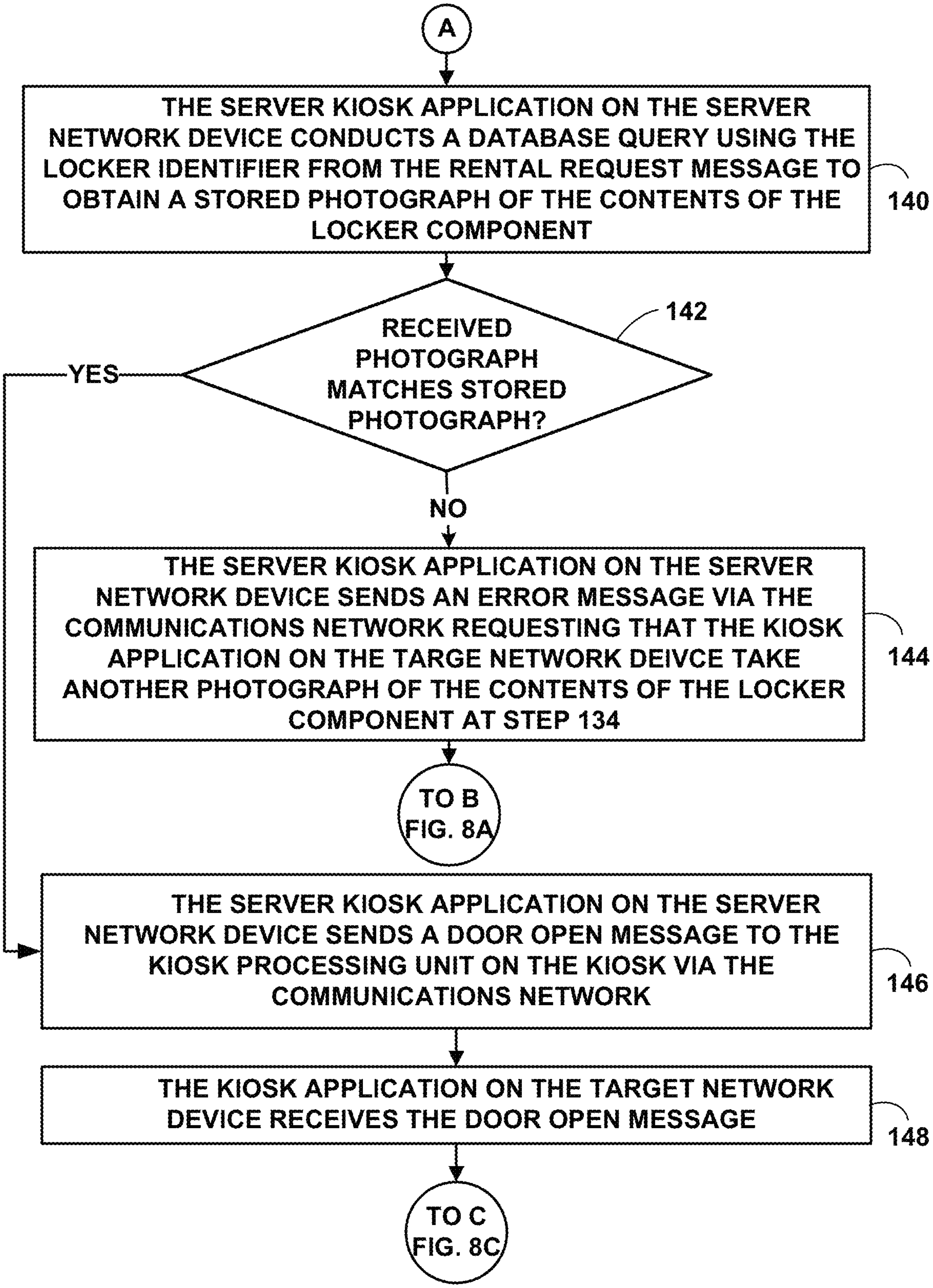
Figure 8C:
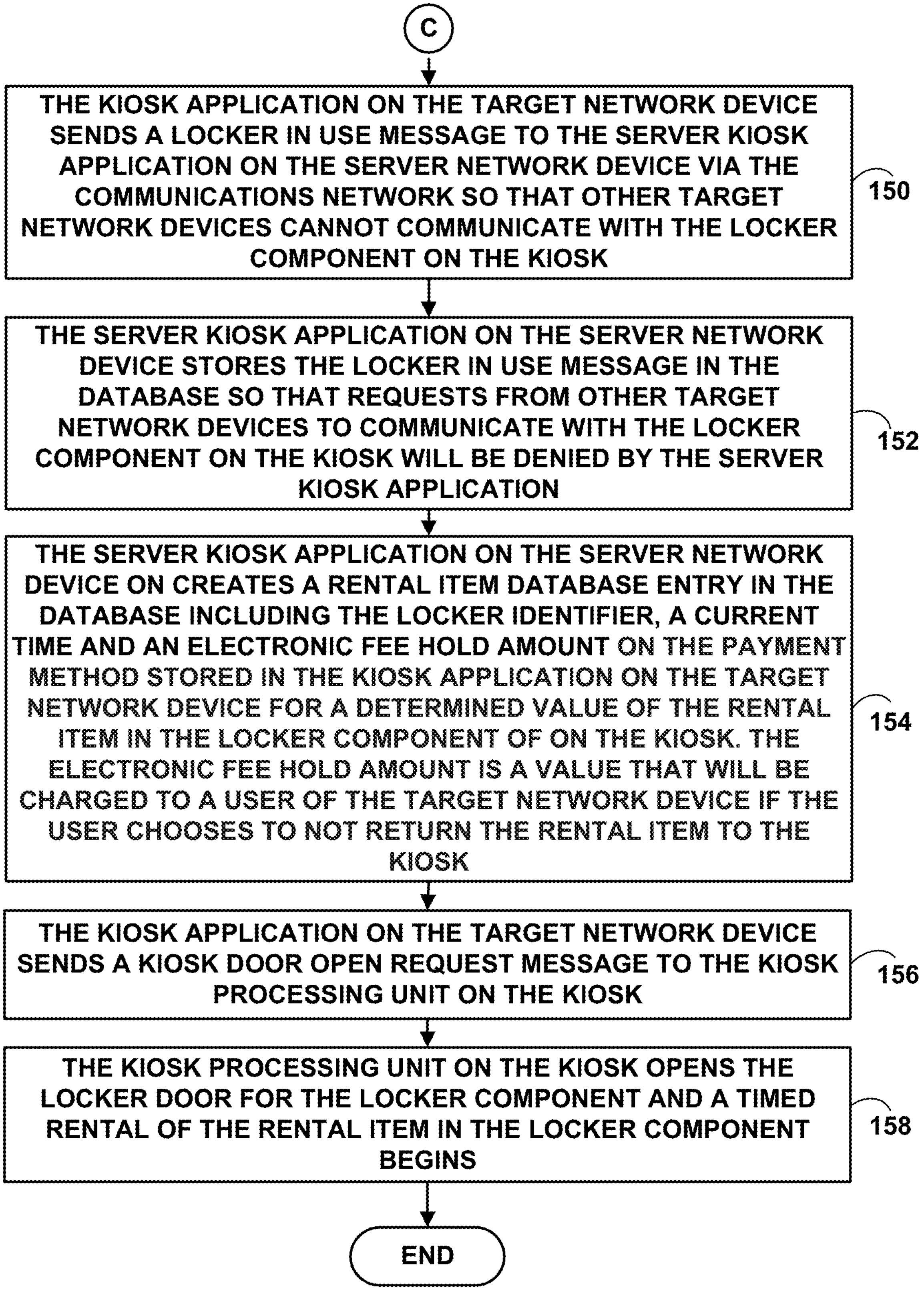

FIGS. 8A, 8B and 8C are a flow diagram illustrating a Method 130 for kiosk rental request processing.

In FIGS. 8A, 8B and 8C, the kiosk including plural locker components.

In FIG. 8A at Step 132, initiating with a selection input from a target kiosk application on a target network device with one or more processors, a rental process on a kiosk, the target kiosk application on the target network device including an electronic payment method input by a user of the target network device to electronically pay rental fees for a renting rental item from the kiosk. At Step 134, the target kiosk application on the target network device uses a camera component to scan a bar code on a locker door component and the target kiosk application on the target network device obtains a locker identifier from the scanned bar code, saves the locker identifier and takes a digital photograph of contents of the locker component through a clear window portion on the front door of the locker component. At Step 136, the target kiosk application on the target network device sends a rental request message including the locker identifier from the scanned bar code and the digital photograph of the contents of the locker component to a server kiosk application on a server network device with one or more processors via a communications network. At Step 138, the server kiosk application on the server network device receives the rental request message via the communications network from the target kiosk application on the target network device. In FIG. 8B, Step 140, the server kiosk application on the server network device conducts a database query using the locker identifier from the rental request message to obtain a stored digital photograph of the contents of the locker component. At Step 142, the server kiosk application on the server network device conducts a test with a computer vision method to determine if the digital photograph from the rental request message matches the stored digital photograph obtained from the database. If the digital photograph from the rental request message does not match the stored digital photograph obtained from the database, then at Step 144, the server kiosk application on the server network device sends an error message via the communications network requesting that the target kiosk application on the target network device take another digital photograph of the contents of the locker component at Step 134. If the digital photograph from the rental request message matches the stored digital photograph obtained from the database, at Step 146, the server kiosk application on the server network device sends a door open message to the kiosk processing unit on the kiosk via the communications network. At Step 148, the target kiosk application on the target network device receives the door open message. In FIG. 8C at Step 150, the target kiosk application on the target network device sends a locker in use message to the server kiosk application on the server network device via the communications network so that other target network devices cannot communicate with the locker component on the kiosk. At Step 152, the server kiosk application on the server network device stores the locker in use message in the database so that requests from other target network devices to communicate with the locker component on the kiosk will be denied by the server kiosk application. At Step 154, the server kiosk application on the server network device on creates a rental item database entry in the database including the locker identifier, a current time and an electronic fee hold amount on the payment method stored in the target kiosk application on the target network device for a determined value of the rental item in the locker component of on the kiosk. The electronic fee hold amount includes a value that will be charged to a user of the target network device if the user chooses to not return the rental item to the kiosk, At Step 156, the target kiosk application on the target network device sends a kiosk door open request message to the kiosk processing unit on the kiosk. At Step 158, the kiosk processing unit on the kiosk opens the locker door for the locker component and a timed rental of the rental item in the locker component begins.

Method 130 is illustrated with an illustrative embodiment. However, the present invention is not limited to such an embodiment and other embodiments can be used to practice the invention.

In FIGS. 8A, 8B and 8C, the kiosk including plural locker components (e.g., 112-122 (FIG. 7).

In FIG. 8A at Step 132, initiating with a selection input from a target kiosk application 30 on a target network device 12, 14, 16, 31, 33, 98-104 with one or more processors, a rental process on a kiosk 11, 108, the target kiosk application 30 on the target network device 12, 14, 16, 31, 33, 98-104 including an electronic payment method input by a user 126 of the target network device 12, 14, 16, 31, 33, 98-104 to electronically pay rental fees for a renting rental item 112-122 from the kiosk 11, 108.

In one embodiment, the electronic payment method includes, a bank account, an easy pay account (e.g., GOOGLE PAY, APPLE PAY, etc.), credit card number, debit card number, a payment account (e.g., PAYPAL, etc.) and/or other type of electronic payment method. However, the present invention is not limited to such embodiments and other embodiments may be used to practice the invention.

At Step 134, the target kiosk application 30 on the target network device 12, 14, 16, 31, 33, 98-104 uses a camera component 14' to scan a bar code 112*q* on a locker door component 112' and the kiosk application 30 on the target network device 12, 14, 16, 31, 33, 98-104 obtains a locker identifier from the scanned bar code 112*q*, saves the locker identifier and takes a digital photograph 128 of contents 112" (e.g., sports equipment, basketball, football, etc.) 112' of the locker component 112.

In one embodiment, the bar codes 112*q*-122*q* includes Quick Response (QR) code. However, the present invention is not limited to such an embodiment and other embodiments can be used to practice the invention.

In one embodiment, the bar codes 112*q*-122*q* also include links to free virtual products (e.g., virtual coupons, discount codes, free and discounted sessions for professional services (e.g., medical, dental, accounting, legal, automotive, etc.). However, the present invention is not limited to such an embodiment and other embodiments can be used to practice the invention.

At Step 136, the target kiosk application 30 on the target network device 12, 14, 16, 31, 33, 98-104 sends a rental request message including the locker identifier from the scanned bar code 112*a* and the digital photograph 128 of the contents 112" of the locker component 112 to a server kiosk application 30*a* on a server network device 20, 22, 24, 26 with one or more processors via a communications network 18, 18'.

At Step 138, the server kiosk application 30*a* on the server network device 20, 22, 24, 26 receives the rental request message via the communications network 18, 18' from the target kiosk application 30 on the target network device 12, 14, 16, 31, 33, 98-104.

In FIG. 8B, Step 140, the server kiosk application 30*a* on the server network device 20, 22, 24, 26 conducts a database 20',22',24',26 query using the locker identifier from the rental request message to obtain a stored digital photograph 128" of the contents 112" of the locker component 112.

At Step 142, the server kiosk application 30*a* on the server network device 20, 22, 24, 26 conducts a test with a computer vision method to determine if the digital photograph 128 from the rental request message matches the stored digital photograph 128" obtained from the database 20',22',24',26'.

In one embodiment, the computer vision method includes an AI photo recognition method to automatically compare two digital photographs. However, the present invention is not limited to such an embodiment and other embodiments with and without AI methods can be used to practice the invention.

If the digital photograph 128 from the rental request message does not match the stored digital photograph 128" obtained from the database 20',22',24',26, then at Step 144, the server kiosk application 30*a* on the server network device 20, 22, 24, 26 sends an error message via the communications network 18, 18' requesting that the target kiosk application 30 on the target network device 12, 14, 16, 31, 33, 98-104 take another digital photograph of the contents 112" of the locker component 112 at Step 134.

If the digital photograph 128 from the rental request message matches the stored digital photograph 128" obtained from the database 20',22',24' 26', at Step 146, the server kiosk application 30*a* on the server network device 20, 22, 24, 26 sends a door open message to the kiosk processing unit 110 on the kiosk 11, 108 via the communications network 18, 18'.

At Step 148, the target kiosk application 30*a* on the target network device 12, 14, 16, 31, 33, 98-104 receives the door open message.

In FIG. 8C at Step 150, the target kiosk application 30 on the target network device 12, 14, 16, 31, 33, 98-104 sends a locker in use message to the server kiosk application 30*a* on the server network device 20, 22, 24, 26 via the communications network 18, 18; so that other target network devices 12, 14, 16, 31, 33, 98-104 cannot communicate with the locker component 112 on the kiosk 11, 108.

In one embodiment, the target kiosk application 30 on the target network device 12, 14, 16, 31, 33, 98-104 publishes a MQTT doorOpen JSON object over the topic 'client/pub/${kiosk-id}'. The kiosk 11, 108, which is subscribed to this topic, receives the command and opens the door 112*a* of the locker 112 specified in the message. However, the present invention is not limited to such an embodiment and other embodiments can be used to practice the invention.

At Step 152, the server kiosk application 30*a* on the server network device 29, 22, 24, 26 stores the locker in use message in the database 20',22',24',26' so that requests from other target network devices 12, 14, 16, 31, 33, 98-104 to communicate with the locker component 112 on the kiosk 11, 108 will be denied by the server kiosk application 30*a*.

At Step 154, the server kiosk application 30*a* on the server network device 20, 22, 24, 26 on creates a rental item database entry in the database 20',22',24',26' including the locker identifier, a current time and an electronic fee hold amount on the payment method stored in the target kiosk application 30 on the target network device 12, 14, 16, 31, 33, 98-104 for a determined value of the rental item 112" in the locker component 112 of on the kiosk 11, 108. The electronic fee hold amount is a value that will be charged to a user 126 of the target network device 12, 14, 16, 31, 33, 98-104 if the user 126 chooses to not return the rental item 112" to the kiosk 11, 108.

At Step 156, the target kiosk application 30 on the target network device 12, 14, 16, 31, 33, 98-104 sends a kiosk door open request message to the kiosk processing 110 unit on the kiosk 11, 108.

At Step 158, the kiosk processing unit 110 on the kiosk 11,108 opens the locker door 112*a* for the locker component 112 and a timed rental of the rental item 112" in the locker component 112 begins.

Figure 9A:
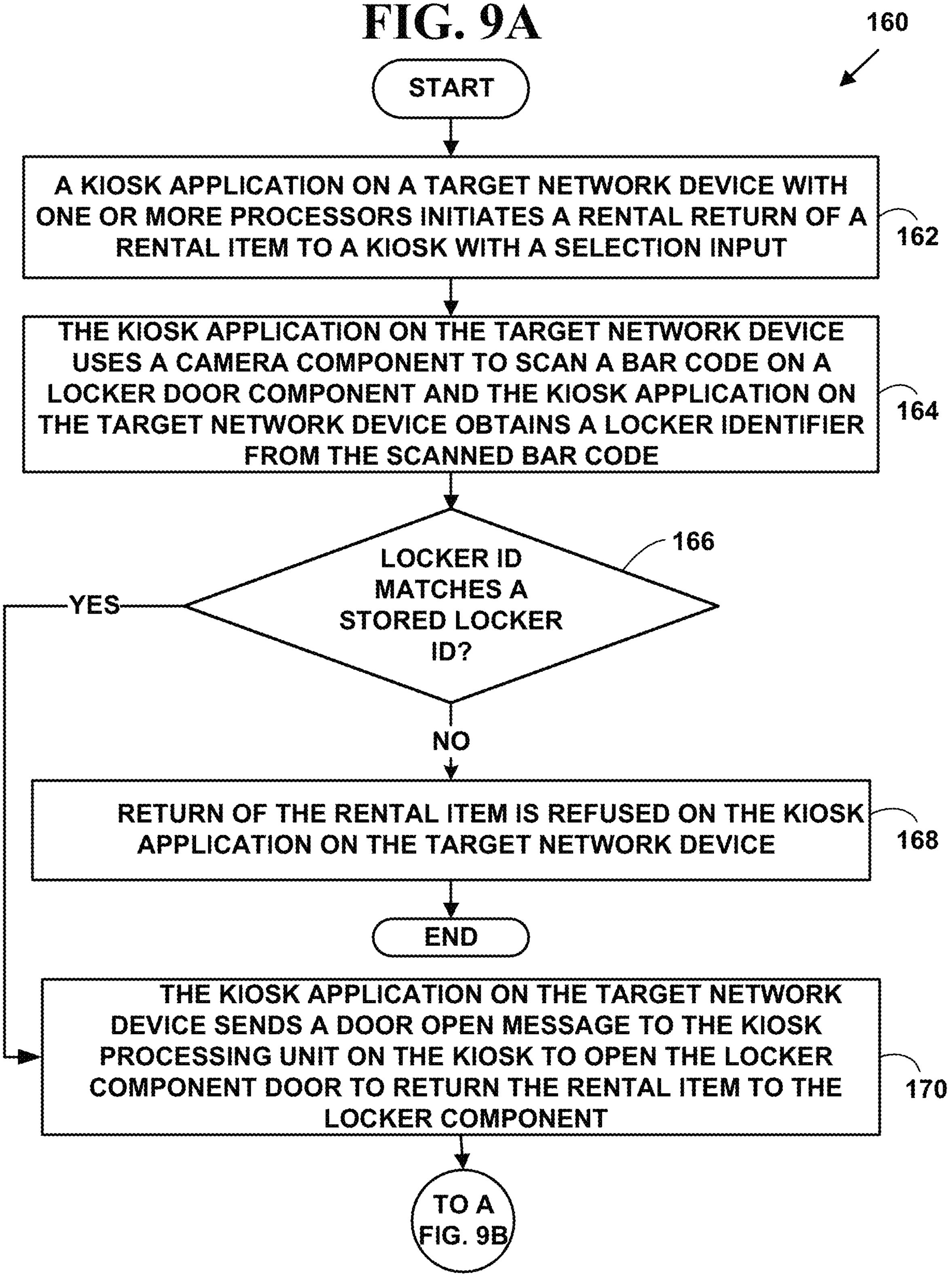
FIGS. 9A, 9B, 9C and 9D are a flow diagram illustrating a method for kiosk rental return processing.
Figure 9B:
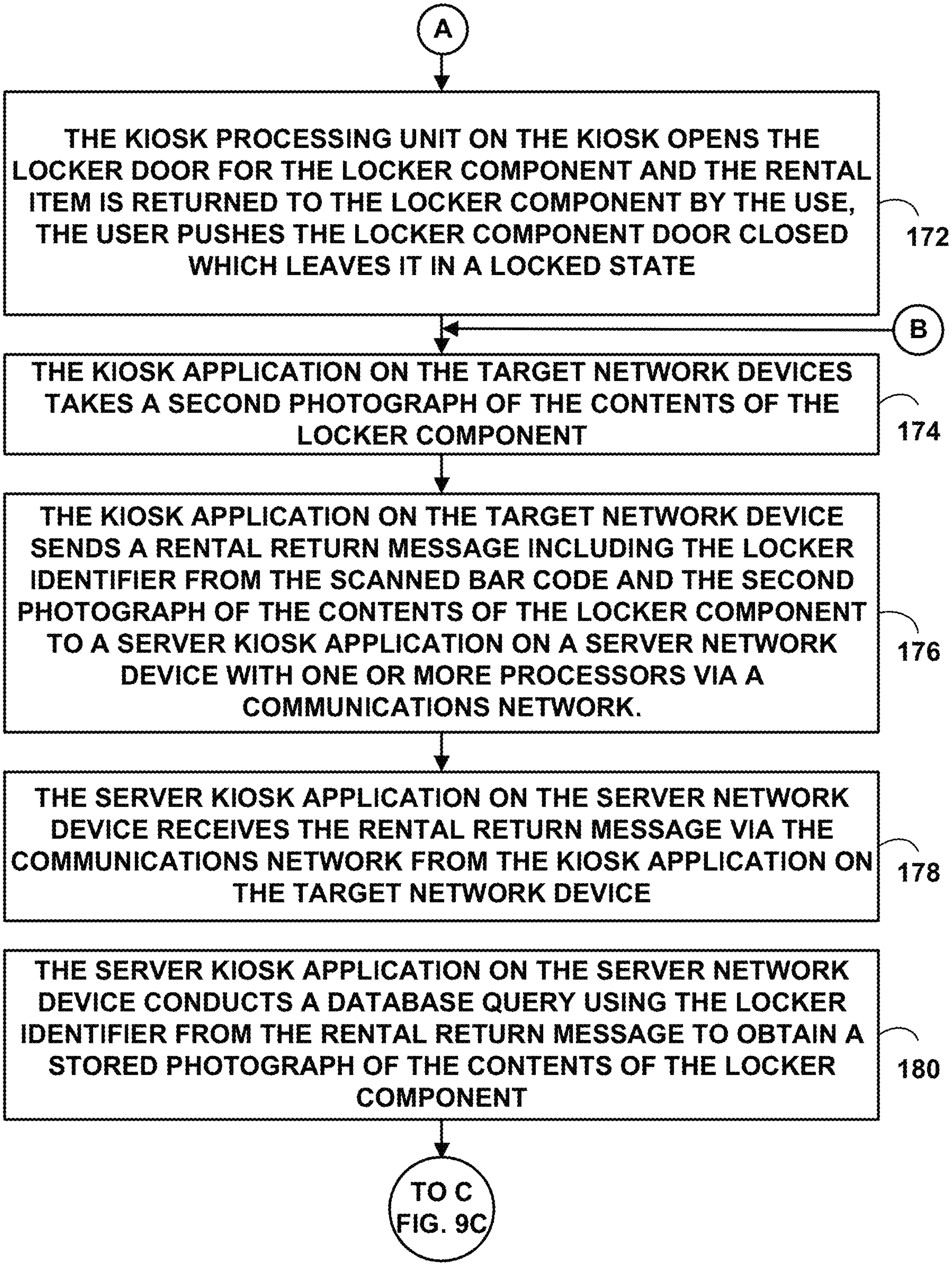
Figure 9C:
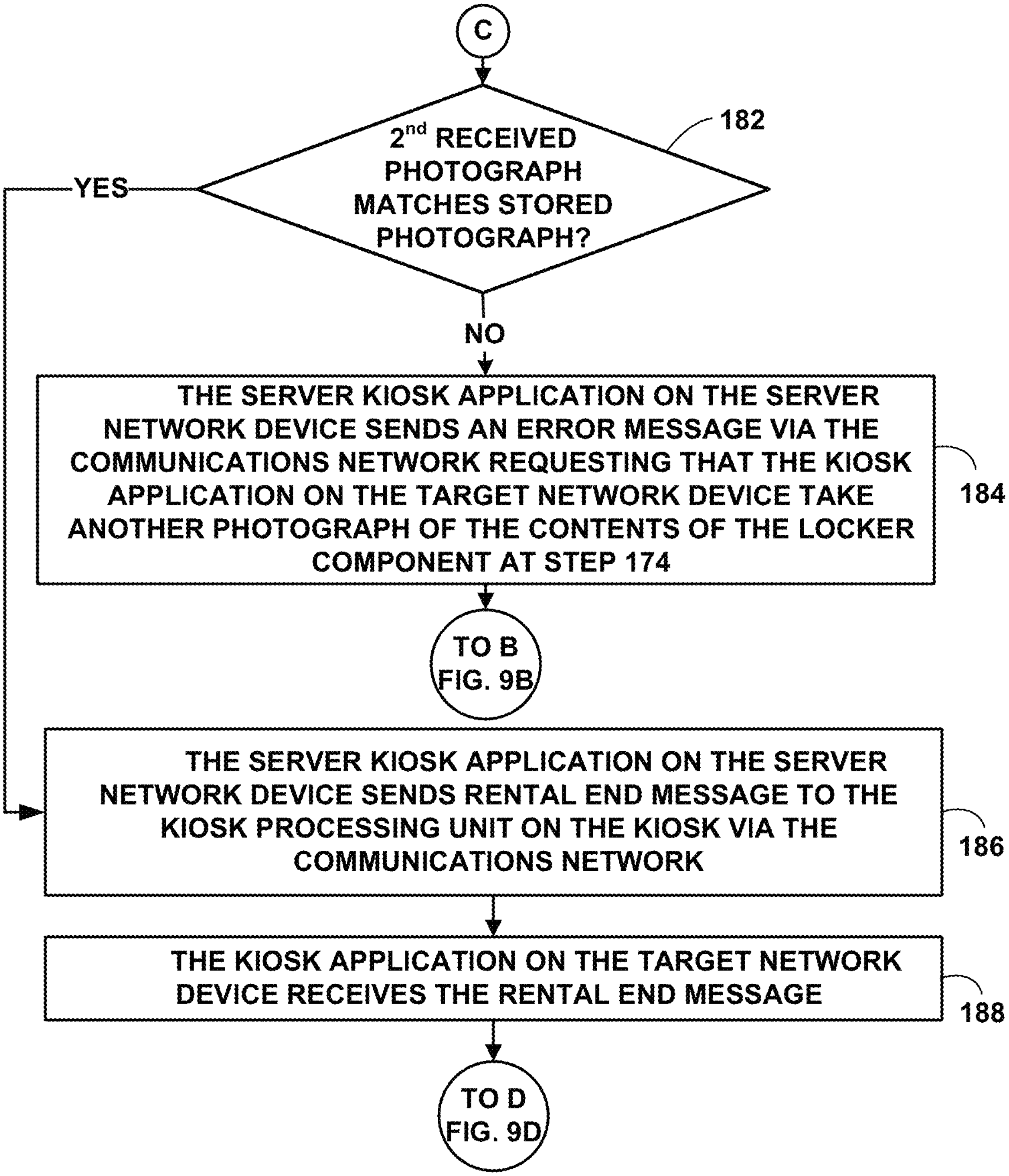

FIGS. 9A, 9B and 9C are a flow diagram illustrating a Method 160 for kiosk rental return processing.

In FIGS. 9A, 9B and 9C, the kiosk including plural locker components.

Figure 9D:
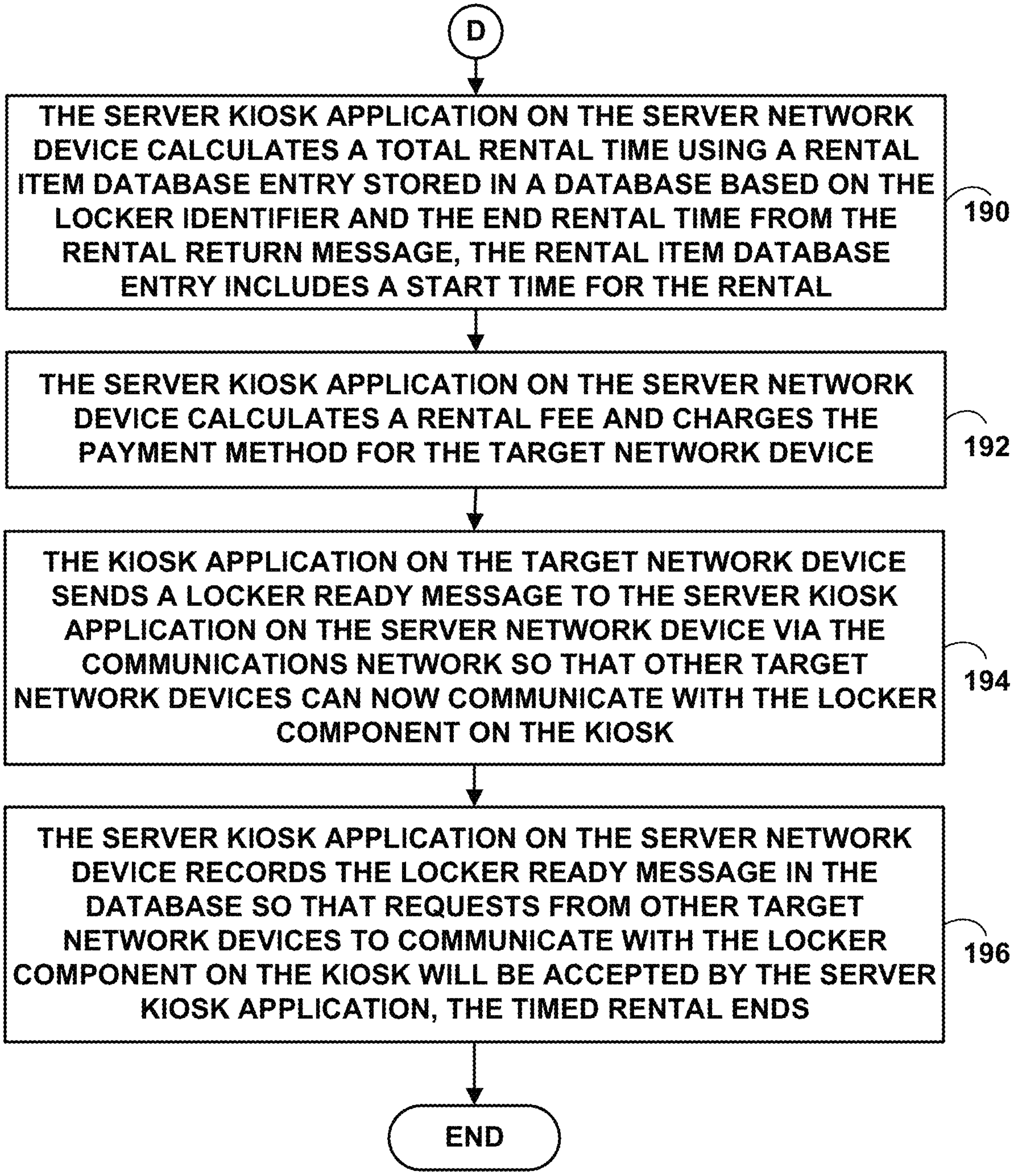

In FIG. 9A, at Step 162, a kiosk application on a target network device with one or more processors initiates a rental return of a rental item to a kiosk with a selection input. At Step 164, the target kiosk application on the target network device uses a camera component to scan a bar code on a locker door component and the target kiosk application on the target network device obtains a locker identifier from the scanned bar code. At Step 166, the target kiosk application on the target network device conducts a test to determine if the locker identifier matches a stored locker identifier used to rent the rental item being return to the kiosk. If at Step 166, the locker identifier from the scanned bar code does not match the stored locker identifier, then at Step 168, return of the rental item is refused on the kiosk application on the target network device. If at Step 166, the locker identifier from the scanned bar code does match the stored locker identifier, then at Step 170, the target kiosk application on the target network device sends a door open message to the kiosk processing unit on the kiosk to open the locker component door to return the rental item to the locker component. In FIG. 9B, at Step 172, the kiosk processing unit on the kiosk opens the locker door for the locker component and the rental item is returned to the locker component by the user. The user pushes the locker component door closed which leaves it in a locked state. In FIG. 9B, at Step 174, the target kiosk application on the target network device takes a second digital photograph of the contents of the locker component. At Step 176, the target kiosk application on the target network device sends a rental return message including the locker identifier from the scanned bar code and the second digital photograph of the contents of the locker component to a server kiosk application on a server network device with one or more processors via a communications network. At Step 178, the server kiosk application on the server network device receives the rental return message via the communications network from the kiosk application on the target network device. At Step 180, the server kiosk application on the server network device conducts a database query using the locker identifier from the rental return message to obtain a stored digital photograph of the contents of the locker component. In FIG. 9C at Step 182, the server kiosk application on the server network device conducts a test with a computer vision method to determine if the second digital photograph from the rental return message matches the stored digital photograph obtained from the database. If the second digital photograph from the rental return message does not match the stored digital photograph obtained from the database, then at Step 184, the server kiosk application on the server network device sends an error message via the communications network requesting that the target kiosk application on the target network device take another digital photograph of the contents of the locker component at Step 174. If the second digital photograph from the rental return message matches the stored digital photograph obtained from the database, at Step 186, the server kiosk application on the server network device sends rental end message to the kiosk processing unit on the kiosk via the communications network. At Step 188, the target kiosk application on the target network device receives the rental end message. In FIG. 9D, at Step 190, the server kiosk application on the server network device calculates a total rental time using a rental item database entry stored in the database based on the locker identifier and the end rental time from the rental return message. The rental item database entry includes a start time for the rental. At Step 192, the server kiosk application on the server network device calculates a rental fee and charges the payment method for the target network device. At Step 194, the target kiosk application on the target network device sends a locker ready message to the server kiosk application on the server network device via the communications network so that other target network devices can now communicate with the locker component on the kiosk. At Step 196, the server kiosk application on the server network device records the locker ready message in the database so that requests from other target network devices to communicate with the locker component on the kiosk will be accepted by the server kiosk application on the server network device. The timed rental ends.

Method 160 is illustrated with an illustrative embodiment. However, the present invention is not limited to such an embodiment and other embodiments can be used to practice the invention.

In FIGS. 9A, 9B and 9C, the kiosk including plural locker components (e.g., 112-122 (FIG. 7).

In FIG. 9A, at Step 162, a kiosk application 30 on a target network device 12, 14, 16, 31, 33, 98-104 with one or more processors initiates a rental return of a rental item 112" to a kiosk 11, 108 with a selection input.

At Step 164, the kiosk application 30 on the target network device 12, 14, 16, 31, 33, 98-104 uses a camera component 14' to scan a bar code 112*q* on a locker door component 112' and the kiosk application 30 on the target network device 12, 14, 16, 31, 33, 98-104 obtains a locker identifier 112 from the scanned bar code 112*q*.

In one embodiment, the bar code 112*q* includes a Quick Response (QR) code. However, the present invention is not limited to such an embodiment and other embodiments may be used to practice the invention.

At Step 166, the kiosk application 30 on the target network device 12, 14, 16, 31, 33, 98-104 conducts a test to determine if the locker identifier 112 matches a stored locker identifier 112 used to rent the rental item 112" being return to the kiosk 11, 108.

In another embodiment, the kiosk application 30 on the target network device 12, 14, 16, 31, 33, 98-104 sends the locker identifier 112 obtained from scanning the bar code 112*q* to a server kiosk application 30*a* on a server network device 20, 22, 24, 26 to conduct the locker identifier test. However, the present is not limited to such an embodiment and other embodiments are used to practice the invention.

If at Step 166, the locker identifier 112 from the scanned bar code 112*q* does not match the stored locker identifier, then at Step 168, return of the rental item 112" is refused on the kiosk application 30 on the target network device 12, 14, 16, 31, 33, 98-104.

If at Step 166, the locker identifier 112 from the scanned bar code 112*q* does match the stored locker identifier 112, then at Step 170, the kiosk application 30 on the target network device 12, 14, 16, 31, 33, 98-104 sends a door open message to the kiosk processing unit 110 on the kiosk 11, 108 to open the locker component door 112' to return the rental item 112" to the locker component 112.

In one embodiment, the kiosk application 30 on the target network device 12, 14, 16, 31, 33, 98-104 publishes a MQTT doorState JSON object over the topic ‘client/pub/${kiosk-id}’. The state of the door 112' (open/closed) is returned to the user 126. If the door 112' is not closed, the user 126 is prompted to close before continuing return process. In one embodiment, the hardware configuration of the kiosk 11, 108 features a solenoid lock in an “always locked” state meaning that the door 112' will always be locked unless the solenoid relay is being driven high. Therefore, if the door 112' is closed, the user 126 cannot open the door without sending a doorOpen command to the locker 112. There is no need to send a “Door Lock” command to the kiosk 8, 108. However, the present invention is not limited to such an embodiment and other embodiments can be used to practice the invention.

In FIG. 9B, at Step 174, the kiosk application 30 on the target network device 12, 14, 16, 31, 33, 98-104 takes a second digital photograph 128" of the contents of the locker component 112*a*.

At Step 176, the kiosk application 30 on the target network device 12, 14, 16, 31, 33, 98-104 sends a rental return message including the locker identifier 112 from the scanned bar code 112*q* and the second digital photograph 128" of the contents of the locker component 112 to a server kiosk application 30*a* on a server network device 20, 22, 24, 26 with one or more processors via a communications network 18, 18'.

At Step 178, the server kiosk application 30*a* on the server network device 20, 22, 24, 26 receives the rental return message via the communications network 18, 18' from the kiosk application 30 on the target network device 12, 14, 16, 31, 33, 98-104.

At Step 180, the server kiosk application 30*a* on the server network device 20, 22, 24, 26 conducts a database query using the locker identifier 112 from the rental return message to obtain a stored digital photograph 128''' of the contents 112" of the locker component 112.

In FIG. 9C at Step 182, the server kiosk application 30*a* on the server network device 20, 22, 24, 26 conducts a test with a computer vision method to determine if the second digital photograph 128" from the rental return message matches the stored digital photograph 128''' obtained from the database 20',22',24',26'.

In one embodiment, the computer vision method includes an AI photo recognition method to automatically compare two digital photographs. However, the present invention is not limited to such an embodiment and other embodiments with and without AI methods can be used to practice the invention.

If the second digital photograph 128" from the rental return message does not match the stored digital photograph 128" obtained from the database 20',22',24',26', then at Step 184, the server kiosk application 30*a* on the server network device 20, 22, 24, 26 sends an error message via the communications network 18, 18' requesting that the kiosk application 30 on the target network device 12, 14, 16, 31, 33, 98-104, take another digital photograph of the contents 112" of the locker component 112 at Step 174.

If the if the second digital photograph 128" from the rental return message matches the stored digital photograph 128''' obtained from the database 20',22',24',26', at Step 186, the server kiosk application 30*a* on the server network device 20, 22, 24, 26 sends rental end message to the kiosk processing unit 110 on the kiosk 11, 108 via the communications network 18, 18'.

At Step 188, the target kiosk application on the target network device receives the rental end message.

In FIG. 9D, at Step 190, the server kiosk application 30*a* on the server network device 20, 22, 24, 26 calculates a total rental time using a rental item database entry stored in the database 20',22',24',26' based on the locker identifier 112 and the end rental time from the rental return message. The rental item database entry includes a start time for the rental.

In another embodiment, the kiosk application 30 on the target network device 12, 14, 16, 31, 33, 98-104 calculates a total rental time using a rental start time stored on the kiosk application 30. However, the present invention is not limited to such an embodiment and other embodiments may be used to practice the invention.

At Step 192, the server kiosk application 30*a* on the server network device 20, 22, 24, 24 calculates a rental fee and charges the payment method for the target network device 12, 14, 16, 31, 33, 98-104.

At Step 194, the kiosk application 30 on the target network device 12, 14, 16, 31, 33, 98-104 sends a locker ready message to the server kiosk application 30*a* on the server network device 20, 22, 24, 26 via the communications network 18, 18' so that other target network devices 12, 14, 16, 31, 33, 98-104 can now communicate with the locker component 112 on the kiosk 11, 108.

At Step 196, the server kiosk application 30*a* on the server network device 20, 22, 24, 26 records the locker ready message in the database 20',22',24',26' so that requests from other target network devices 12, 14, 16, 31, 33, 98-104 to communicate with the locker component 112 on the kiosk 11, 108 will be accepted by the server kiosk application 30*a* on the server network device 20, 22, 24, 26. The timed rental of the rental item 112"-122" in the locker component ends.

Figure 10:
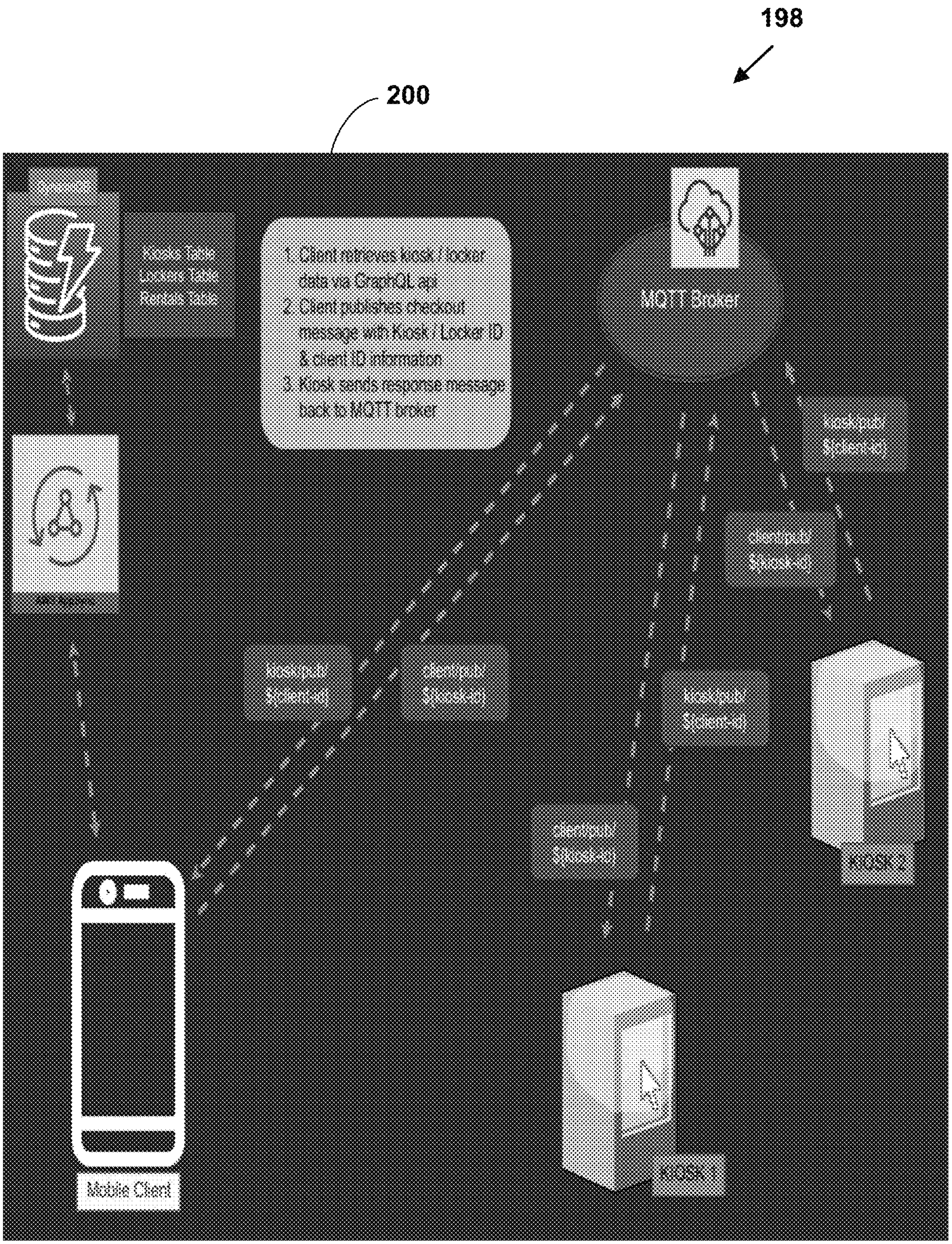
FIG. 10 is a block diagram illustrating a dataflow for kiosk rental request processing.

FIG. 10 is a block diagram 198 illustrating a dataflow 200 for kiosk rental request processing.

Figure 11:
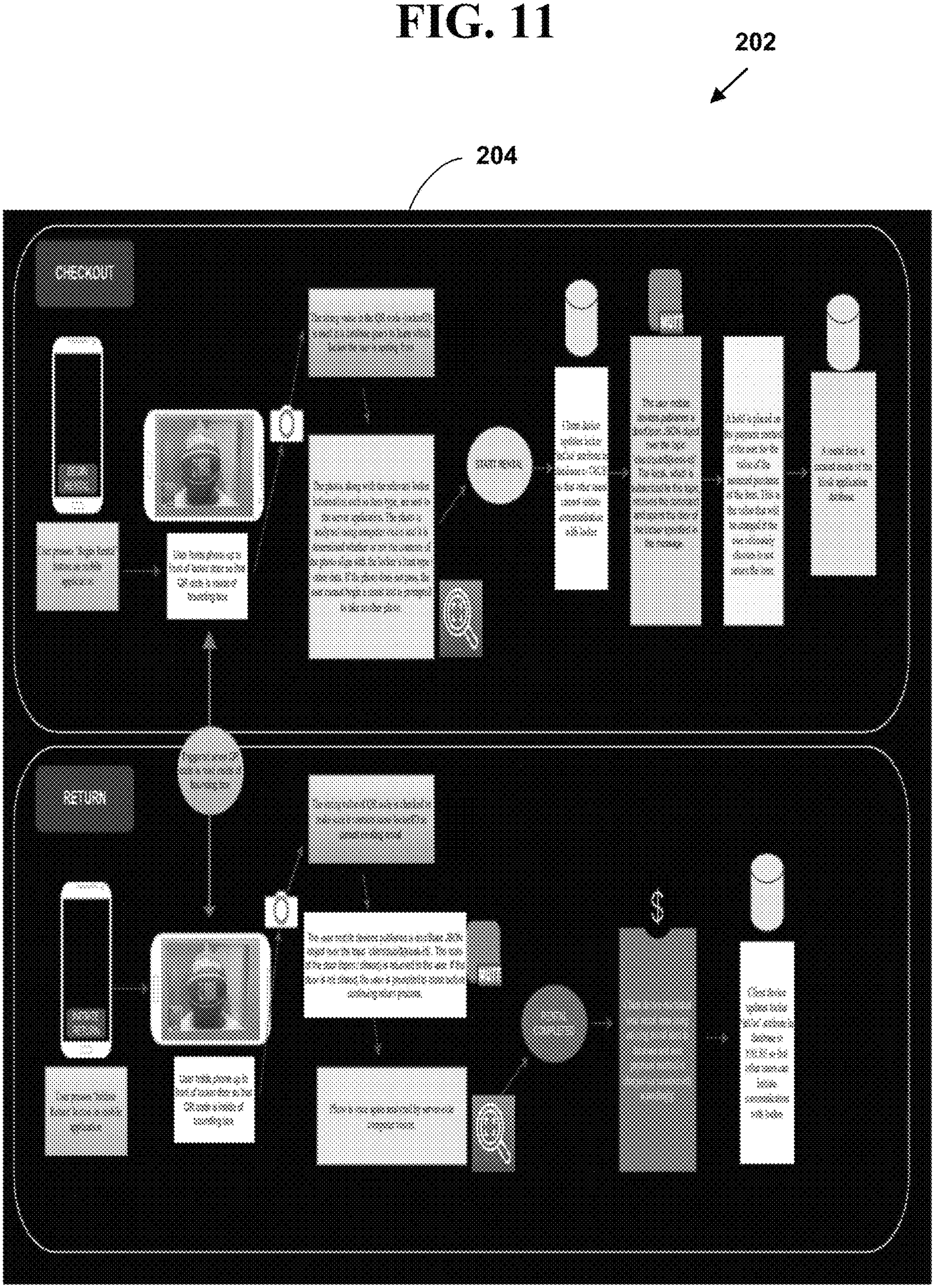
FIG. 11 is a block diagram illustrating a dataflow for kiosk rental request and return processing.

FIG. 11 is a block diagram 202 illustrating a dataflow 204 for kiosk rental request and return processing.

The kiosks 11, 108 were primarily described herein to automatically rent and return sports equipment. However, the present invention is not limited to such an embodiment and the kiosk 11, 108 can be used to rent and return power tools, hand tools, camping equipment, cleaning equipment (e.g., carpet cleaners, etc.), boating equipment, etc. including virtually any rental item that can be fit into a locker component 112-122.

An automated network connected kiosk rental system apparatus with mobile application integration is present herein. Rental items are placed in rental locker components in a kiosk. The rental items are automatically and securely rented and returned to the kiosk without human supervision. The rental items are automatically and securely rented and returned to the kiosk using a kiosk application on a target network device and a kiosk server application on a server kiosk network device both in communications with the kiosk via a communications network.

It should be understood that the architecture, programs, processes, methods and systems described herein are not related or limited to any particular type of computer system or network system (hardware or software), unless indicated otherwise. Various types of computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A kiosk processing system for rental items, comprising in combination:
- a kiosk, including a kiosk processing unit with one or more processors, a non-transitory computer readable medium, a power source and a kiosk application,
- the kiosk application controlling operation of the kiosk;
- a stand to support the kiosk and to allow the kiosk to be secured to a surface and to prevent movement and theft of the kiosk;
- the kiosk including a plurality of individual compartments;
- the plurality of individual compartments each including an individual compartment door and a locking means;
- the plurality of individual compartments including a plurality of individual locker components;
- the plurality of individual locker components assembled in modular fashion to form the kiosk;
- the plurality of individual locker components all of a same size; or the plurality of individual locker components including varying sizes to store rental items of different sizes;
- the plurality of individual compartments including a plurality of rental items; that are rented out with a rental process for a pre-determined period of time and for a pre-determined fee,
- the plurality of rental items removeable from the plurality of individual compartments and returnable to the plurality of individual compartments after the pre-determined time of the rental process expires;
- the locking means, locking and unlocking the plurality of individual compartment doors of the plurality of individual compartments,
- the locking means controlled by the kiosk application;
- one or more network interface cards (NIC) for communicating with a communications network;
- one or more camera components to document, provide security and identify users of the rental process on the kiosk;
- a plurality of bar codes on a plurality of individual compartment doors for scanning a bar code from the plurality of bar codes by one or more target kiosk applications on one or more target network devices each with one or more processors to initiate and complete the rental process on the kiosk;
- initiating with a first selection input from a target kiosk application on a target network device with one or more processors, the rental process on the kiosk, the target kiosk application on the target network device including an electronic payment method input by a user of the target network device, to electronically pay rental fees for a renting a rental item from the kiosk;

scanning with a camera component on the target kiosk application on the target network device, the bar code on an individual compartment door of an individual locker component on the kiosk for; obtaining a locker identifier from the scanned bar code, saving the locker identifier and taking a digital photograph of contents of the individual locker component through a clear window portion on a front door of the individual locker component;

sending from the target kiosk application on the target network device a rental request message including the locker identifier from the scanned bar code and the digital photograph of the contents of the individual locker component to a server kiosk application on a server network device with one or more processors via a communications network;

receiving on the server kiosk application on the server network device, the rental request message via the communications network from the target kiosk application on the target network device;

conducting on the server kiosk application on the server network device a first database query using the locker identifier from the rental request message to obtain a stored digital photograph of the contents of the individual locker component;

conducting a first test on the server kiosk application on the server network device with a computer vision method to determine, if the digital photograph from the rental request message does not match the stored digital photograph obtained from the database, then sending from server kiosk application on the server network device a first error message via the communications network requesting that the target kiosk application on the target network device take another digital photograph of the contents of the locker component, and if the digital photograph from the rental request message matches the stored digital photograph obtained from the database, then the server kiosk application on the server network device sends a door open message to the kiosk processing unit on the kiosk via the communications network;

receiving on the target kiosk application on the target network device the door open message;

sending from the target kiosk application on the target network device a locker in use message to the server kiosk application on the server network device via the communications network so that other target network devices cannot communicate with the individual locker component on the kiosk;

storing from the server kiosk application on the server network device a locker in use message in the database so that other requests from other target network devices to communicate with the individual locker component on the kiosk will be denied by the server kiosk application;

creating on the server kiosk application on the server network device a rental item database entry in the database including: the locker identifier, a current time and an electronic fee hold amount on the electronic payment method stored in the target kiosk application on the target network device for a determined value of the rental item in the individual locker component on the kiosk, the electronic fee hold amount includes a monetary value that will be charged to the user of the target network device if the user chooses to not return the rental item to the kiosk;

sending from the target kiosk application on the target network device a kiosk door open request message to the kiosk processing unit on the kiosk; and opening from kiosk processing unit on the kiosk locker door for the locker component and a timed rental of the rental item in the individual locker component begins.

2. The kiosk processing system for rental items of claim 1, wherein the rental items include sports equipment comprising: balls, ball gloves, rackets, bats, skates, gloves, shoes, skis, boots, poles, kayaks, paddle boards, paddles, or bicycles, or a combination thereof.

3. The kiosk processing system for rental items of claim 1, wherein the locking means includes an electronic lock or a smart lock.

4. The kiosk processing system for rental items of claim 1, the network interface cards (NIC) on the kiosk and the target network device include one or more wireless communications interfaces comprising: cellular telephone, 802.11a, 802.11b, 802.11 g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), 802.15.1 (BLUETOOTH), infra data association (IrDA), wireless communication interfaces, or a combination thereof.

5. The kiosk processing system for rental items of claim 1, wherein the target network device include: cell phones, laptop computers, tablet computers, smart phones, personal digital/data assistants (PDA), portable game consoles, wearable network devices, or Internet of Things (IoT), Radio Frequency Identifier (RFID) tags, target network devices.

6. The kiosk processing system for rental items of claim 1, wherein the plurality of bar codes include a plurality of Quick Response (QR) bar codes.

7. The kiosk processing system for rental items of claim 1, wherein the power source includes a Direct Current (DC) power source including one or more batteries or one or more solar panels or an Alternating Current (AC) power source.

8. The kiosk processing system for rental items of claim 1, further including one or more of: one or more display screens, one or more speakers, one or more lighting components, one or more solar panels, or one or more biometric interfaces, or a combination thereof.

9. The kiosk processing system for rental items of claim 1, further including:

a cloud communications network, one or more cloud server network devices with a cloud server kiosk application, and one or more cloud storage objects, the cloud server kiosk application providing a cloud computing Infrastructure as a Service (IaaS), including a cloud software infrastructure service, the cloud platform as a Service (PaaS) including a cloud software platform service and Specific cloud software services as a Service (Saas) including a specific SaaS, for Kiosk interoperability services.

10. The kiosk processing system for rental items of claim 9 wherein, the one or more cloud storage objects include Representational state transfer (REST), Simple Object Access Protocol (SOAP), Lightweight Directory Access Protocol (LDAP), cloud storage objects.

11. The kiosk processing system for rental items of claim 1 wherein, kiosk processing unit includes a cellular telephone enabled microcontroller (MCU).

12. The kiosk processing system for rental items of claim 11 wherein, the kiosk processing unit including the MCU sends and receives commands on the kiosk via a Message Queuing Telemetry Transport (MQTT) message protocol sending messages to and receiving messages from the target kiosk applications on the one or target network devices and the server kiosk application on the server network device via the communications network.

13. The kiosk processing system for rental items of claim 1, further comprising recording the rental events and the pre-determined fees received from the rental process on the kiosk in a blockchain.

14. The kiosk processing system for rental items of claim 1, wherein the kiosk application on the kiosk includes an artificial intelligence (AI) application for identifying users of the kiosk, spotting rental trends of rental items, for dispensing and returning rental items.

15. The kiosk processing system for rental items of claim 1, wherein all the plurality of individual compartments or selected ones of the plurality of individual compartments include one or more additional free physical products.

16. The kiosk processing system for rental items of claim 14, wherein the one or more additional free physical products include a bar code or a universal resource locator (URL) for a virtual product or a virtual service.

17. The kiosk processing system for rental items of claim 1, the kiosk further including desired colors, graphics, plastic wraps, vinyl wraps, other types of wrapping materials, for branding or advertising for specific branding or advertising partners.

18. A kiosk processing system for rental items, comprising in combination:

a kiosk, including a kiosk processing unit with one or more processors, a non-transitory computer readable medium, a power source and a kiosk application, the kiosk application controlling operation of the kiosk;

a stand to support the kiosk and to allow the kiosk to be secured to a surface and to prevent movement and theft of the kiosk;

the kiosk including a plurality of individual compartments;

the plurality of individual compartments each including an individual compartment door and a locking means;

the plurality of individual compartments including a plurality of individual locker components;

the plurality of individual locker components assembled in modular fashion to form the kiosk;

the plurality of individual locker components all of a same size; or the plurality of individual locker components including varying sizes to store rental items of different sizes;

the plurality of individual compartments including a plurality of rental items; that are rented out with a rental process for a pre-determined period of time and for a pre-determined fee, the plurality of rental items removeable from the plurality of individual compartments and returnable to the plurality of individual compartments after the pre-determined time of the rental process expires;

the locking means, locking and unlocking the plurality of individual compartment doors of the plurality of individual compartments, the locking means controlled by the kiosk application;

one or more network interface cards (NIC) for communicating with a communications network;

one or more camera components to document, provide security and identify users of the rental process on the kiosk;

a plurality of bar codes on a plurality of individual compartment doors for scanning a bar code from the plurality of bar codes by one or more target kiosk applications on one or more target network devices each with one or more processors to initiate and complete the rental process on the kiosk;

initiating with a second selection input on a target kiosk application on a target network device including a rental return of a rental item to the kiosk;

scanning with the camera component on the target kiosk application on the target network device a bar code on the individual locker door component to obtain the locker identifier from the scanned bar code;

conducting a test on the target kiosk application on the target network device to determine if the locker identifier matches the stored locker identifier used to rent the rental item being returned to the kiosk, if the locker identifier from the scanned bar code does not match the stored locker identifier then, refusing return of the rental on the target kiosk application on the target network device and the locker component door is not opened, and if the locker identifier from the scanned bar code does match the stored locker identifier then, the target kiosk application on the target network device sends a door open message to the kiosk processing unit on the kiosk to open the locker component door to return the rental item to the individual locker component;

opening from the kiosk processing unit on the kiosk the individual locker door for the locker component and the rental item is returned to the individual locker component by the user;

receiving on the kiosk processing unit a door closed signal when the individual locker component door is closed leaving the individual locker component door in a locked state;

taking from the camera component on the target kiosk application on the target network device a second digital photograph of the contents of the individual locker component;

sending from the target kiosk application on the target network device a rental return message including the locker identifier from the scanned bar code and the second digital photograph of the contents of the individual locker component to the server kiosk application on the server network device via the communications network;

receiving on the server kiosk application on the server network device the rental return message via the communications network from the target kiosk application on the target network device;

conducting on the server kiosk application on the server network device a database query using the locker identifier from the rental return message to obtain the stored digital photograph of the contents of the individual locker component;

conducting a test on the server kiosk application on the server network device with a computer vision method to determine, if the second photograph from the rental return message does not match the stored digital photograph obtained from the database, then the server kiosk application on the server network device sends an error message via the communications network requesting that the target kiosk application on the target network device take another digital photograph of the contents of the locker component, and if the second digital photograph from the rental return message matches the stored photograph obtained from the database, then the server kiosk application on the server network device sends a rental end message to the kiosk processing unit on the kiosk via the communications network;

receiving on the target kiosk application on the target network device the rental end message;

calculating on the server kiosk application on the server network device a total rental time using the rental item database entry stored in the database based on the locker identifier and an end rental time from the rental return message, wherein the rental item database entry includes the start rental time for the rental;

calculating on the server kiosk application on the server network device a rental fee and charging the electronic payment method for the target network device;

sending from the target kiosk application on the target network device a locker ready message to the server kiosk application on the server network device via the communications network so that other target network devices can now communicate with the locker component on the kiosk; and recording on the server kiosk application on the server network device the locker ready message in the database so that requests from other target network devices to communicate with the individual locker component on the kiosk will be accepted by the server kiosk application on the server network device and the timed rental of the rental item in the locker component ends.

19. A kiosk processing system for rental items, comprising in combination: a kiosk, including a kiosk processing unit with one or more processors, a non-transitory computer readable medium, a power source and a kiosk application, a kiosk, including a kiosk processing unit with one or more processors, a non-transitory computer readable medium, a power source and a kiosk application, the kiosk application controlling operation of the kiosk;

a stand to support the kiosk and to allow the kiosk to be secured to a surface and to prevent movement and theft of the kiosk;

the kiosk including a plurality of individual compartments;

the plurality of individual compartments each including an individual compartment door and a locking means;

the plurality of individual compartments including a plurality of individual locker components;

the plurality of individual locker components assembled in modular fashion to form the kiosk;

the plurality of individual locker components all of a same size; or the plurality of individual locker components including varying sizes to store rental items of different sizes;

the plurality of individual compartments including a plurality of rental items; that are rented out with a rental process for a pre-determined period of time and for a pre-determined fee, the plurality of rental items removeable from the plurality of individual compartments and returnable to the plurality of individual compartments after the pre-determined time of the rental process expires;

the locking means, locking and unlocking the plurality of individual compartment doors of the plurality of individual compartments, the locking means controlled by the kiosk application;

one or more network interface cards (NIC) for communicating with a communications network;

one or more camera components to document, provide security and identify users of the rental process on the kiosk;

a plurality of bar codes on a plurality of individual compartment doors for scanning a bar code from the plurality of bar codes by one or more target kiosk applications on one or more target network devices each with one or more processors to initiate and complete the rental process on the kiosk;

initiating with a first selection input from a target kiosk application on a target network device with one or more processors, the rental process on the kiosk, the target kiosk application on the target network device including an electronic payment method input by a user of the target network device, to electronically pay rental fees for a renting a rental item from the kiosk;

scanning with a camera component on the target kiosk application on the target network device, the bar code on an individual compartment door of an individual locker component on the kiosk for; obtaining a locker identifier from the scanned bar code, saving the locker identifier and taking a digital photograph of contents of the individual locker component through a clear window portion on a front door of the individual locker component;

sending from the target kiosk application on the target network device a rental request message including the locker identifier from the scanned bar code and the digital photograph of the contents of the individual locker component to a server kiosk application on a server network device with one or more processors via a communications network;

receiving on the server kiosk application on the server network device, the rental request message via the communications network from the target kiosk application on the target network device;

conducting on the server kiosk application on the server network device a first database query using the locker identifier from the rental request message to obtain a stored digital photograph of the contents of the individual locker component;

conducting a first test on the server kiosk application on the server network device with a computer vision method to determine, if the digital photograph from the rental request message does not match the stored digital photograph obtained from the database, then sending from server kiosk application on the server network device a first error message via the communications network requesting that the target kiosk application on the target network device take another digital photograph of the contents of the locker component, and if the digital photograph from the rental request message matches the stored digital photograph obtained from the database, then the server kiosk application on the server network device sends a door open message to the kiosk processing unit on the kiosk via the communications network;

receiving on the target kiosk application on the target network device the door open message;

sending from the target kiosk application on the target network device a locker in use message to the server kiosk application on the server network device via the communications network so that other target network devices cannot communicate with the individual locker component on the kiosk;

storing from the server kiosk application on the server network device a locker in use message in the database so that other requests from other target network devices to communicate with the individual locker component on the kiosk will be denied by the server kiosk application;

creating on the server kiosk application on the server network device a rental item database entry in the database including: the locker identifier, a current time and an electronic fee hold amount on the electronic payment method stored in the target kiosk application on the target network device for a determined value of the rental item in the individual locker component on the kiosk, the electronic fee hold amount includes a monetary value that will be charged to the user of the target network device if the user chooses to not return the rental item to the kiosk;

sending from the target kiosk application on the target network device a kiosk door open request message to the kiosk processing unit on the kiosk;

opening from kiosk processing unit on the kiosk locker door for the locker component and a timed rental of the rental item in the individual locker component begins;

initiating with a second selection input on the target kiosk application on the target network device including a rental return of the rental item to the kiosk;

scanning with the camera component on the target kiosk application on the target network device the bar code on the individual locker door component to obtain the locker identifier from the scanned bar code;

conducting a test on the target kiosk application on the target network device to determine if the locker identifier matches the stored locker identifier used to rent the rental item being returned to the kiosk, if the locker identifier from the scanned bar code does not match the stored locker identifier then, refusing return of the rental on the target kiosk application on the target network device and the locker component door is not opened, and if the locker identifier from the scanned bar code does match the stored locker identifier then, the target kiosk application on the target network device sends a door open message to the kiosk processing unit on the kiosk to open the locker component door to return the rental item to the individual locker component;

opening from the kiosk processing unit on the kiosk the individual locker door for the locker component and the rental item is returned to the individual locker component by the user;

receiving on the kiosk processing unit a door closed signal when the individual locker component door is closed leaving the individual locker component door in a locked state;

taking from the camera component on the target kiosk application on the target network device a second digital photograph of the contents of the individual locker component;

sending from the target kiosk application on the target network device a rental return message including the locker identifier from the scanned bar code and the second digital photograph of the contents of the individual locker component to the server kiosk application on the server network device via the communications network;

receiving on the server kiosk application on the server network device the rental return message via the communications network from the target kiosk application on the target network device;

conducting on the server kiosk application on the server network device a database query using the locker identifier from the rental return message to obtain the stored digital photograph of the contents of the individual locker component;

conducting a test on the server kiosk application on the server network device with a computer vision method to determine, if the second photograph from the rental return message does not match the stored digital photograph obtained from the database, then the server kiosk application on the server network device sends a second error message via the communications network requesting that the target kiosk application on the target network device take another digital photograph of the contents of the locker component, and if the second digital photograph from the rental return message matches the stored photograph obtained from the database, then the server kiosk application on the server network device sends a rental end message to the kiosk processing unit on the kiosk via the communications network;

receiving on the target kiosk application on the target network device the rental end message;

calculating on the server kiosk application on the server network device a total rental time using the rental item database entry stored in the database based on the locker identifier and an end rental time from the rental return message, wherein the rental item database entry includes the start rental time for the rental;

calculating on the server kiosk application on the server network device a rental fee and charging the electronic payment method for the target network device;

sending from the target kiosk application on the target network device a locker ready message to the server kiosk application on the server network device via the communications network so that other target network devices can now communicate with the locker component on the kiosk; and recording on the server kiosk application on the server network device the locker ready message in the database so that requests from other target network devices to communicate with the individual locker component on the kiosk will be accepted by the server kiosk application on the server network device and the timed rental of the rental item in the locker component ends.

20. The kiosk processing system for rental items of claim 1 wherein, a state of a rental process is managed within the kiosk server application on the kiosk server network device.

21. The kiosk processing system for rental items of claim 1 wherein, the kiosk processing unit includes a cellular telephone enabled microcontroller (MCU) and the MCU includes: (1) a stateless system that does not manage or keep track of a status or state of any rental process on the MCU; or (2) a is a state-based system that manages and keeps track of the status or state of any rental process on the MCU.

22. The kiosk processing system for rental items of claim 1 wherein, the kiosk processing unit including a Message Queuing Telemetry Transport (MQTT) message protocol for establishing connections between the kiosk, the one or more target kiosk applications on the one or more target network devices and the server kiosk application on the server network device via the communications network.

* * * * *